United States Patent
Kamen et al.

(10) Patent No.: US 6,581,714 B1
(45) Date of Patent: Jun. 24, 2003

(54) STEERING CONTROL OF A PERSONAL TRANSPORTER

(75) Inventors: Dean L. Kamen, Bedford, NH (US); Richard William Arling, Windham, NH (US); J. Douglas Field, Bedford, NH (US); John B. Morrell, Manchester, NH (US); Jonathan B. Pompa, Allentown, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 09/687,789

(22) Filed: Oct. 13, 2000

Related U.S. Application Data

(63) Continuation-in-part of application No. 09/325,976, filed on Jun. 4, 1999, which is a continuation-in-part of application No. 08/479,901, filed on Jun. 7, 1995, now Pat. No. 5,975,225, which is a continuation-in-part of application No. 08/384,705, filed on Feb. 3, 1995, now Pat. No. 5,971,091, which is a continuation-in-part of application No. 08/250,693, filed on May 27, 1994, now Pat. No. 5,701,965, which is a continuation-in-part of application No. 08/021,789, filed on Feb. 24, 1993, now abandoned.

(51) Int. Cl.$^7$ .......................... B62D 51/04; B60K 26/00; H01C 13/00
(52) U.S. Cl. .................. 180/333; 180/19.1; 180/78; 338/50
(58) Field of Search ............... 180/19.1–19.3, 180/315, 78, 333; 338/50, 108, 113, 153

(56) References Cited

U.S. PATENT DOCUMENTS

| | | |
|---|---|---|
| 584,127 A | 6/1897 | Draullette et al. |
| 849,270 A | 4/1907 | Schafer et al. |

(List continued on next page.)

FOREIGN PATENT DOCUMENTS

| | | |
|---|---|---|
| DE | 2 048 593 | 5/1971 |
| DE | 31 28 112 A1 | 2/1983 |
| DE | 32 42 880 A1 | 6/1983 |

(List continued on next page.)

OTHER PUBLICATIONS

Kanoh, *Adaptive Control of Inverted Pendulum, Computrol*, vol. 2, pp. 69–75 (1983).

Yamafuji, *A Proposal for Modular–Structured Mobile Robots for Work that Principally Involve a Vehicle with Two Parallel Wheels, Automation Technology*, vol. 20, pp. 113–118 (1988).

Yamafuji & Kawamura, *Study of Postural and Driving Control of Coaxial Bicycle, Paper Read at Meeting of Japan Society of Mechanical Engineering (Series C)*, vol. 54, No. 501, pp. 1114–1121 (May, 1988).

(List continued on next page.)

*Primary Examiner*—Lesley D. Morris
*Assistant Examiner*—Matthew Luby
(74) *Attorney, Agent, or Firm*—Bromberg & Sunstein LLP

(57) ABSTRACT

Improvements to a motorized balancing personal transporter. An intelligent battery has a battery container sealed against moisture and a plurality of battery blocks housed within the battery container. Additionally, the battery pack has a plurality of sensors, each of which is for monitoring a characteristic of a distinct battery block. The battery pack has a processor that generates a fault flag for transmission to a circuit external to the battery container on occurrence of a critical fault and that transmits an identifying characteristic such as a battery serial number. Various mechanisms are provided for receiving rider input in order to direct steering of the vehicle. These include a rotatable grip for imparting rotary motion to a rotation sensor, a thumb-activated rotation sensor and a palm-activated sensor, each disposed on the handlebar of the vehicle.

2 Claims, 14 Drawing Sheets

U.S. PATENT DOCUMENTS

| | | |
|---|---|---|
| 2,742,973 A | 4/1956 | Johannesen |
| 3,145,797 A | 8/1964 | Taylor |
| 3,260,324 A | 7/1966 | Suarez |
| 3,283,398 A | 11/1966 | Andren |
| 3,288,234 A | 11/1966 | Feliz |
| 3,348,518 A | 10/1967 | Forsyth et al. |
| 3,374,845 A | 3/1968 | Selwyn |
| 3,399,742 A | 9/1968 | Malick |
| 3,446,304 A | 5/1969 | Alimanestiano |
| 3,450,219 A | 6/1969 | Fleming |
| 3,515,401 A | 6/1970 | Gross |
| 3,580,344 A | 5/1971 | Floyd |
| 3,596,298 A | 8/1971 | Durst, Jr. |
| 3,860,264 A | 1/1975 | Douglas et al. |
| 3,872,945 A | 3/1975 | Hickman et al. |
| 3,952,822 A | 4/1976 | Udden et al. |
| 4,018,440 A | 4/1977 | Deutsch |
| 4,062,558 A | 12/1977 | Wasserman |
| 4,076,270 A | 2/1978 | Winchell |
| 4,088,199 A | 5/1978 | Trautwein |
| 4,094,372 A | 6/1978 | Notter |
| 4,109,741 A | 8/1978 | Gabriel |
| 4,111,445 A | 9/1978 | Haibeck |
| 4,151,892 A | 5/1979 | Francken |
| 4,222,449 A | 9/1980 | Feliz |
| 4,264,082 A | 4/1981 | Fouchey, Jr. |
| 4,266,627 A | 5/1981 | Lauber |
| 4,293,052 A | 10/1981 | Daswick et al. |
| 4,325,565 A | 4/1982 | Winchell |
| 4,354,569 A | 10/1982 | Eichholz |
| 4,363,493 A | 12/1982 | Veneklasen |
| 4,373,600 A | 2/1983 | Buschbom et al. |
| 4,375,840 A | 3/1983 | Campbell |
| 4,510,956 A | 4/1985 | King |
| 4,560,022 A | 12/1985 | Kassai |
| 4,566,707 A | 1/1986 | Nitzberg |
| 4,571,844 A | 2/1986 | Komasaku et al. |
| 4,624,469 A | 11/1986 | Bourne, Jr. |
| 4,657,272 A | 4/1987 | Davenport |
| 4,685,693 A | 8/1987 | Vadjunec |
| 4,709,772 A | 12/1987 | Brunet |
| 4,740,001 A | 4/1988 | Torleumke |
| 4,746,132 A | 5/1988 | Eagan |
| 4,770,410 A | 9/1988 | Brown |
| 4,786,069 A | 11/1988 | Tang |
| 4,790,400 A | 12/1988 | Sheeter |
| 4,790,548 A | 12/1988 | Decelles et al. |
| 4,794,999 A | 1/1989 | Hester |
| 4,798,255 A | 1/1989 | Wu |
| 4,802,542 A | 2/1989 | Houston et al. |
| 4,809,804 A | 3/1989 | Houston et al. |
| 4,834,200 A | 5/1989 | Kajita |
| 4,863,182 A | 9/1989 | Chern |
| 4,867,188 A | 9/1989 | Reid |
| 4,869,279 A | 9/1989 | Hedges |
| 4,874,055 A | 10/1989 | Beer |
| 4,890,853 A | 1/1990 | Olson |
| 4,919,225 A | 4/1990 | Sturges |
| 4,953,851 A | 9/1990 | Sherlock et al. |
| 4,984,754 A | 1/1991 | Yarrington |
| 4,985,947 A | 1/1991 | Ethridge |
| 4,998,596 A | 3/1991 | Miksitz |
| 5,002,295 A | 3/1991 | Lin |
| 5,011,171 A | 4/1991 | Cook |
| 5,052,237 A | 10/1991 | Reimann |
| 5,111,899 A | 5/1992 | Reimann |
| 5,158,493 A | 10/1992 | Morgrey |
| 5,168,947 A | 12/1992 | Rodenborn |
| 5,171,173 A | 12/1992 | Henderson et al. |
| 5,186,270 A | 2/1993 | West |
| 5,221,883 A | 6/1993 | Takenaka et al. |
| 5,241,875 A | 9/1993 | Kochanneck |
| 5,248,007 A | 9/1993 | Watkins et al. |
| 5,314,034 A | 5/1994 | Chittal |
| 5,350,033 A | 9/1994 | Kraft |
| 5,366,036 A | 11/1994 | Perry |
| 5,701,965 A | 12/1997 | Kamen et al. |
| 5,701,968 A | 12/1997 | Wright-Ott et al. |
| 5,775,452 A | 7/1998 | Patmont |
| 5,791,425 A | 8/1998 | Kamen et al. |
| 5,794,730 A | 8/1998 | Kamen |
| 5,971,091 A | 10/1999 | Kamen et al.. |
| 5,975,225 A | 11/1999 | Kamen et al. |
| 6,003,624 A | 12/1999 | Jorgensen et al. |
| 6,059,062 A | 5/2000 | Staelin et al. |
| 6,125,957 A | 10/2000 | Kauffmann |
| 6,148,939 A * | 11/2000 | Brookhart et al. .......... 180/333 |
| 6,170,598 B1 * | 1/2001 | Furukawa .................... 180/333 |
| 6,246,232 B1 * | 6/2001 | Okumura ...................... 338/50 |
| 6,276,230 B1 * | 8/2001 | Crum et al. ................. 180/335 |
| 6,288,505 B1 * | 9/2001 | Heinzmann et al. ......... 180/218 |

FOREIGN PATENT DOCUMENTS

| | | |
|---|---|---|
| DE | 3411489 A1 | 10/1984 |
| DE | 298 08 091 U1 | 10/1998 |
| DE | 298 08 096 U1 | 10/1998 |
| EP | 0 109 927 | 7/1984 |
| EP | 0 193 473 | 9/1986 |
| EP | 0 537 698 A1 | 4/1993 |
| FR | 980 237 | 5/1951 |
| FR | 82 04314 | 9/1982 |
| GB | 152664 | 2/1922 |
| GB | 1213930 | 11/1970 |
| GB | 2 139 576 A | 11/1984 |
| JP | 52-44933 | 10/1975 |
| JP | 57-87766 | 6/1982 |
| JP | 57-110569 | 7/1982 |
| JP | 59-73372 | 4/1984 |
| JP | 62-12810 | 7/1985 |
| JP | 0255580 | 12/1985 |
| JP | 61-31685 | 2/1986 |
| JP | 63-305082 | 12/1988 |
| JP | 2-190277 | 7/1990 |
| JP | 6-171562 | 12/1992 |
| JP | 5-213240 | 8/1993 |
| JP | 6-105415 | 12/1994 |
| JP | 7255780 | 3/1995 |
| WO | WO 86/05752 | 10/1986 |
| WO | Wo 89/06117 | 7/1989 |
| WO | WO 96/23478 | 8/1996 |

OTHER PUBLICATIONS

Yamafuji et al., *Synchronous Steering Control of a Parallel Bicycle*, Paper Read at Meeting of Japan Society of Mechanical Engineering (Series C), vol. 55, No. 513, pp. 1229–1234 (May, 1989).

Momoi & Yamafuji, *Motion control of the Parallel Bicycle–Type Mobile Robot Composed of a Triple Inverted Pendulum*, Paper Read at Meeting of Japan Society of Mechanical Engineering (Series C), vol. 57, No. 541, pp. 154–159 (Sep., 1991).

Kawaji, S., *Stabilization of Unicycle Using Spinning Motion*, Denki Gakkai Ronbushi, D, vol. 107, Issue 1, Japan (1987), pp. 21–28.

Schoonwinkel, A., *Design and Test of a Computer–Stabilized Unicycle*, Stanford University (1988), UMI Dissertation Services.

Vos, D., *Dynamics and Nonlinear Adaptive Control of an Autonomous Unicycle*, Massachusetts Institute of Technology, 1989.

Vos, D., *Nonlinear Control of an Autonomous Unicycle Robot: Practical Isues*, Massachusetts Institute of Technology, 1992.

Koyanagi et al., *A Wheeled Inverse Pendulum Type Self-Contained Mobile Robot and its Posture Control and Vehicle Control*, The Society of Instrument and Control Engineers, Special issue of the 31$^{st}$ SICE Annual Conference, Japan 1992, pp. 13–16.

Koyanagi et al., *A Wheeled Inverse Pendulum Type Self-Contained Mobile Robot*, The Society of Instrument and Control Engineers, Special issue of the 31$^{st}$ SICE Annual Conference, Japan 1992, pp. 51–56.

Koyanagi et al., *A Wheeled Inverse Pendulum Type Self-Contained Mobile Robot and its Two Dimensional Trajectory Control*, Proceeding of the Second International Symposium on Measurement and Control in Robotics, Japan 1992, pp. 891–898.

Watson Industries, Inc., Vertical Reference Manual ADS–C132–1A, 1992, pp. 3–4.

News article *Amazing Wheelchair Goes Up and Down Stairs*.

Osaka et al., *Stabilization of unicycle*, Systems and Control, vol. 25, No. 3, Japan 1981, pp. 159–166 (Abstract Only).

Roy et al., *Five–Wheel Unicycle System*, Medical & Biological Engineering & Computing, vol. 23, No. 6, United Kingdom 1985, pp. 593–596.

Kawaji, S., *Stabilization of Unicycle Using Spinning Motion*, Denki Gakkai Ronbushi, D, vol. 107, Issue 1, Japan 1987, pp. 21–28 (Abstract Only).

Schoonwinkel, A., *Design and Test of a Computer–Stabilized Unicycle*, Dissertation Abstracts International, vol. 49/03–B, Stanford University 1988, pp. 890–1294 (Abstract only).

Vos et al., *Dynamics and Nonlinear Adaptive Control of an Autonomous Unicycle—Theory and Experiment*, American Institute of Aeronautics and Astronautics, A90–26772 10–39, Washington, D.C. 1990, pp. 487–494 (Abstract only).

Tecknico's Home Page, *Those Amazing Flying Machines*, http://www.swiftsite.com/technico.

*Stew's Hovercraft Page*, http://www.stewcam.com/hovercraft.html.

\* cited by examiner

STEERING CONTROL OF A PERSONAL TRANSPORTER

The present application is a continuation-in-part of U.S. application Ser. No. 09/325,976, filed Jun. 4, 1999, itself a continuation in part of U.S. application Ser. No. 08/479,901, filed Jun. 7, 1995, now issued as U.S. Pat. No. 5,975,225, which is a continuation in part of U.S. application Ser. No. 08/384,705, filed Feb. 3, 1995, now issued as U.S. Pat. No. 5,971,091, which is a continuation in part of U.S. application Ser. No. 08/250,693, filed May 27, 1994, now issued as U.S. Pat. No. 5,701,965, which in turn is a continuation in part of U.S. application Ser. No. 08/021,789, filed Feb. 24, 1993, now abandoned, all of which applications are hereby incorporated by reference.

FIELD OF THE INVENTION

The present application is directed to modes of powering and controlling a motorized personal transporter.

BACKGROUND OF THE INVENTION

Dynamically stabilized transporters refer to personal vehicles having a control system that actively maintains the stability of the transporter while the transporter is operating. The control system maintains the stability of the transporter by continuously sensing the orientation of the transporter, determining the corrective action to maintain stability, and commanding the wheel motors to make the corrective action. If the transporter loses the ability to maintain stability, such as through the failure of a component, the rider may experience discomfort at the sudden loss of balance. For some dynamically stabilized transporters, such as those described in U.S. Pat. No. 5,701,965, which may include a wheelchair for transporting a disabled individual down a flight of stairs, it is essential, for the safety of the operator, that the vehicle continue to operate indefinitely after detection of a failed component. For other dynamically stabilized transporters, however, the operator may readily be capable of safely dismounting from the transporter in case of component failure. It is desirable that control modes be provided for such vehicles from which the operator is capable of safely dismounting in case of mishap.

SUMMARY OF THE INVENTION

In accordance with preferred embodiments of the present invention, there is provided an intelligent battery pack. The battery pack has a battery container sealed against moisture and a plurality of battery blocks housed within the battery container. Additionally, the battery pack has a plurality of sensors, each of which is for monitoring a characteristic of a distinct battery block. Finally, the battery pack has a processor disposed within the battery container for generating a fault flag for transmission to a circuit external to the battery container on occurrence of a critical fault in at least one of the battery blocks within the battery container.

In accordance with alternate embodiments of the invention, the battery pack may also have an electrical connector in communication with the processor for providing electrical and signal communication between the processor and circuitry exterior to the container. At least one of the plurality of sensors may be a temperature sensor in thermal contact with at least one of the plurality of battery blocks. The battery container may include battery cells additional to the plurality of battery blocks or a second sensor for monitoring a characteristic of the at least one of a battery block, the second sensor also being in signal communication with the connector. The second sensor may be a voltage sensor generating a signal characteristic of the voltage of the battery block.

In accordance with further alternate embodiments of the invention, the processor of the intelligent battery pack of claim 1 may also transmit an identifying characteristic of the battery pack, where the identifying characteristic may be a battery cell type, a number of battery cells, or a serial number.

In accordance with another aspect of the invention, a rider detector is provided for detecting the presence of a rider on a base of a two-wheeled dynamically balanced transporter. The rider detector has a mat covering the base of the transporter, the mat itself having a mat edge attached to the base, a mat wall having a bottom portion and a top portion, the bottom portion attached to the mat edge, and a mat cover having a top surface and a bottom surface, with the mat cover attached to the mat wall and supported above the base. Finally, the rider detector has a switch mounted on the base and positioned below the bottom surface of the mat cover, the switch changing from a first state to a second state when the mat cover is displaced into contact with the switch. Additionally, a rigid plate may be disposed under the bottom surface of the mat cover.

In accordance with yet another aspect of the invention, a statically unstable motorized transporter is provided that has a base for supporting a rider and a pair of laterally disposed wheels for supporting the base above a surface. The transporter has a motorized drive for driving the pair of wheels, a pitch sensor coupled to the base, the sensor generating a signal indicative of a transporter pitch and a controller for commanding the motorized drive based only on the transporter pitch.

In accordance with other aspects of the invention, a steering device is provided for a motorized vehicle having a handlebar. The steering device has a rotation sensor, such as a potentiometer, coupled to the handlebar for generating a steering command upon rotation, a rotatable grip for imparting rotary motion to the rotation sensor, and a torsional spring for restoring the rotatable grip to a neutral position upon release of the grip. Alternatively, the steering device may have a rotation sensor coupled to a structure fixed with respect to the user support for generating a steering command upon sensing rotation, a flexible shaft coupled to the rotation sensor, a thumb button for imparting bending to the flexible shaft in such a manner as to provide rotation measured by the rotation sensor, and a spring member for providing a force countering bending of the flexible shaft.

In accordance with alternate embodiments of the invention, the steering device has lever with a top surface substantially flush with the handlebar, the lever being movable by a palm of a hand of the user about a pivot axis substantially parallel to the underlying surface and substantially parallel to the direction of travel of the vehicle. The steering device also has a restoring member for opposing motion of the lever from a neutral position and a sensor for sensing motion of the lever from the neutral position and for generating in response thereto a steering command.

BRIEF DESCRIPTION OF THE DRAWINGS

FIG. 6b shows a cut side view of the embodiment of FIG. 6a;

DESCRIPTION OF PREFERRED EMBODIMENTS

A personal transporter may be said to act as 'balancing' if it is capable of operation on one or more wheels but would be unable to stand on the wheels but for operation of a control loop governing operation of the wheels. A balancing personal transporter lacks static stability but is dynamically balanced. The wheels, or other ground-contacting elements, that provide contact between such a personal transporter and the ground or other underlying surface, and minimally support the transporter with respect to tipping during routine operation, are referred to herein as 'primary ground-contacting elements.'

Figure 1:
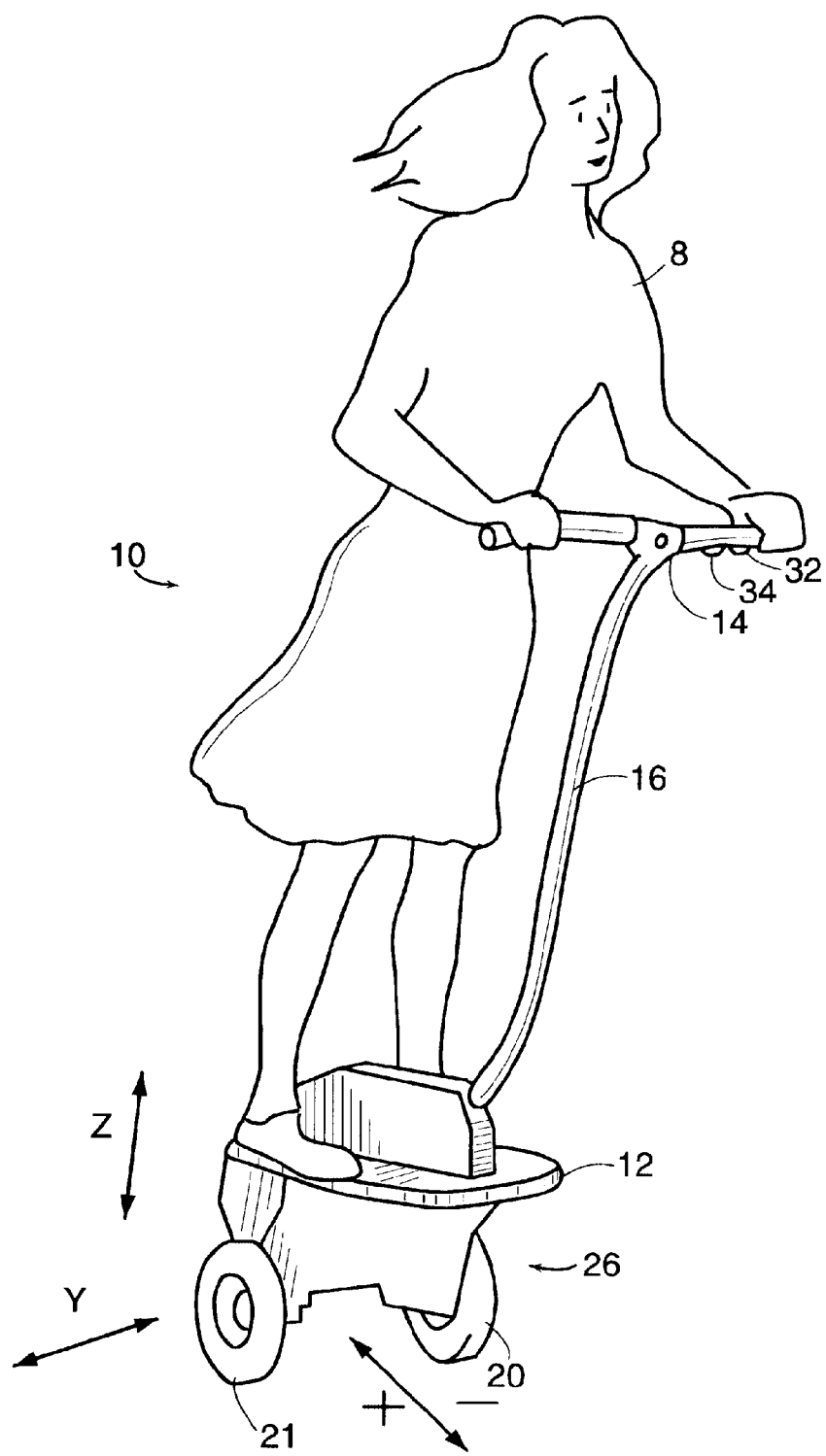
FIG. 1 is a side view of a personal vehicle lacking a stable static position, for supporting or conveying a subject who remains in a standing position thereon.

An embodiment of a balancing personal transporter in accordance with the present invention is depicted in FIG. 1 and designated generally by numeral 10. In certain applications, operation of personal transporter 10 may not require operation for an extended period of time in case of failure. Fail-operative operation may be desirable, however, for a definite period of time in order to allow the transporter to maintain stability while stopping and permitting a user to alight from the vehicle. While certain balancing personal transporters may not be required to operate indefinitely if a component fails, it may, however, advantageously provide fail-detect redundant architecture wherein the critical components such as gyros, batteries, motor windings, and processors are replicated and run in parallel during operation of the transporter. If a failure occurs in one line of components, the parallel line will still maintain the stability of the transporter for at least a short period of time. In accordance with the present invention and as discussed below, the short period of continued operation is advantageously used to bring the transporter to a stop while maintaining balance and then turn off the wheel motors. The transporter is brought to a stop by commanding the transporter to pitch backward as is done in speed limiting.

User 8 is shown in FIG. 1, standing on platform (or 'base') 12 of ground-contacting module 26. Wheels 21 and 22 are shown as coaxial about the Y axis. Steering or other control may be provided by thumb wheels 32 and 34, or by other user input mechanisms described in detail below. A handlebar 14 may be provided on stalk 16 for gripping by the user.

Figure 2:
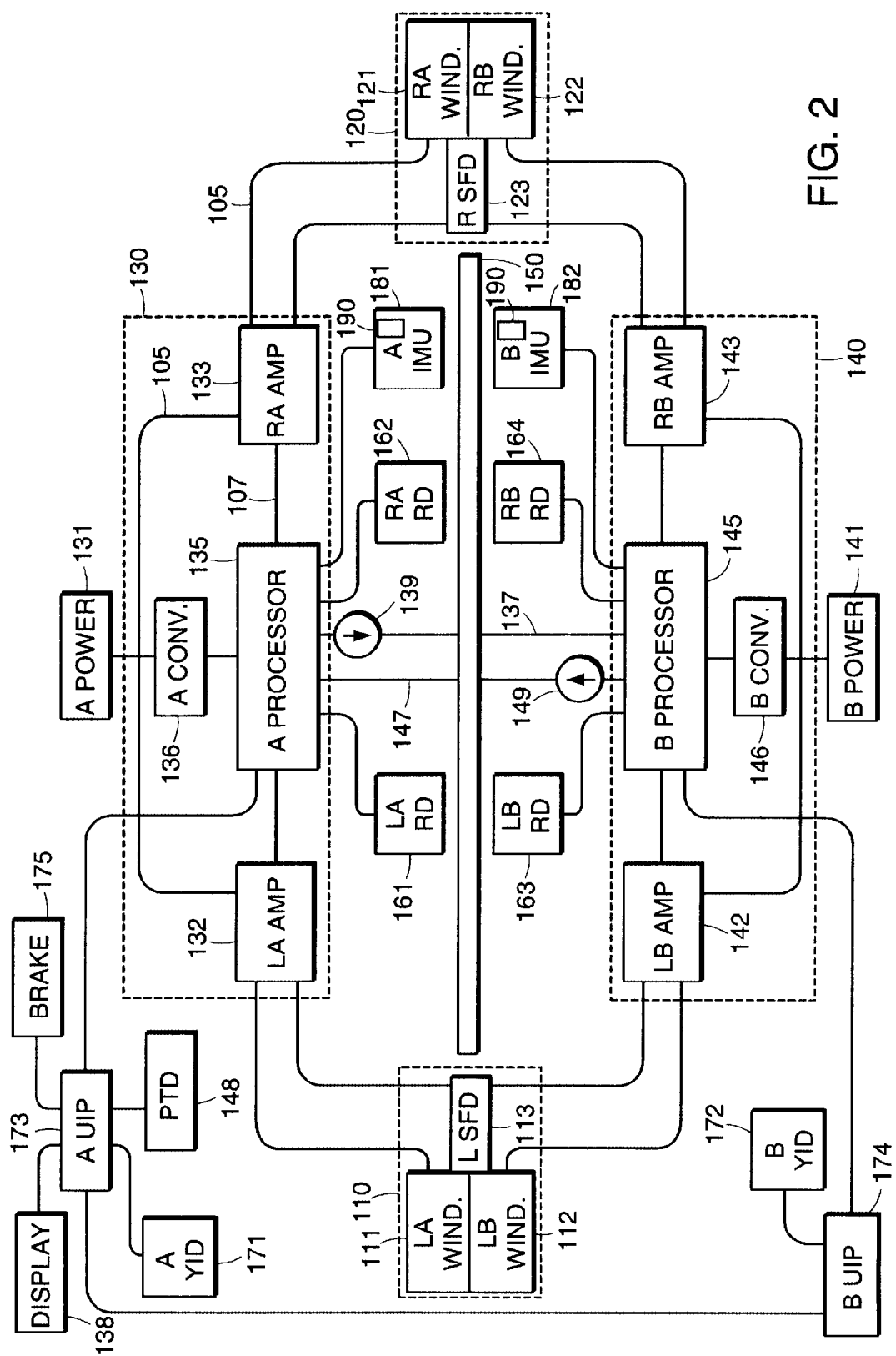
FIG. 2 shows a block diagram of the system architecture of an embodiment of the present invention.

Referring now to FIG. 2, a block diagram is shown of the system architecture of an embodiment of the present invention. A left motor 110 drives a left wheel 20 (shown in FIG. 1) and a right motor 120 drives a right wheel 21. Motors 110 and 120 are preferably DC brushless but may be either AC or DC motors and either brushed or brushless. Each motor is energized by a redundant set of windings 111, 112, 121, 122. Each winding is capable of energizing the motor in the event the complimentary winding is unable to energize the motor. In the discussion below, each redundant component is distinguished by a two letter group identifying either the left (L) or right (R) side of the transporter and either the A group or B group of redundant components. For example, the left motor winding energized by the A group of components is designated as the LA winding.

Each of motor windings 111, 112, 121, 122 is driven by a motor amplifier 132, 133, 142, 143. The A-group amplifiers 132, 133 are supplied by the A-group power supply 131 and the B-group amplifiers 142, 143 are supplied by the B-group power supply 141. The electrical connections between the power supplies and amplifiers and between the amplifiers and motor windings are expected to carry large currents up to 20 to 40 Amperes and are identified by thick lines 105 in FIG. 2.

Each motor 110 120 has a shaft feedback device (SFD) 113 123 that measures the position or angular velocity of the motor shaft. The SFD is in signal communication with the motor amplifiers driving the motor associated with the SFD. For example, the right SFD 123 associated with the right motor 120 is in signal communication with the RA amplifier 133 and the RB amplifier 143. The SFD is preferably a Hall sensor that determines the position of the shaft, however the SFD may be selected from a variety of sensors such as encoders, resolvers, and tachometers, all listed without limitation for purposes of example. Certain sensors, such as tachometers, may also be used to measure the shaft velocity. Conversion of a signal representing instantaneous shaft velocity to or from a signal representing position is accomplished by integrating or differentiating the signal, respectively.

The A-group amplifiers 132, 133 are commanded by the A processor 135 while the B-group amplifiers 142, 143 are commanded by the B processor 145. Power is supplied to the A processor from the A power source 131 through the A-group DC-DC converter 136. Similarly, the B power source 141 supplies power to the B processor 146 through the B-group DC-DC converter 145. The A-group amplifiers 132, 133, A-group converter 136, and A processor 135 are preferably grouped together into a compartment or tray 130 that is at least partially isolated by a barrier 150 from the B-tray 140 containing the B-group amplifiers, B-group converter, and B processor. Physically separating the A tray 130 and B tray 140 reduces the probability of a common point failure. The barrier 150 acts to delay the propagation of a failure, in one tray to the other tray such that the transporter has sufficient time to put the rider in a safe condition to exit the transporter. Similarly, the A power supply 131 is physically separated from the B power supply 141. The A power supply 131 and the components in the A tray 130 are capable of driving both motors 110, 120 for a short period of time, on the order of a few seconds, in the event of a failure in any one of the B-group components. Conversely, the B power supply 141 and the components in the B tray 140 are capable of driving both motors 110, 120 for a short period of time if an A-group component fails.

Although the processors 135, 145 are physically isolated from each other, signal communication is maintained between the processors via communication channels 137, 147. Communication channels 137, 147 are preferably electrical conductors but may also be electromagnetic such as optical, infrared, microwave, or radio. The A channel 137 transmits signals from the A processor 135 to the B processor 145 and the B channel 147 transmits signals from the B processor 145 to the A processor 135. Optical isolators 139, 149 are incorporated into channels 137, 147 to prevent over-voltages from propagating from a shorted processor to the other processor.

Each processor receives signals from a plurality of sensors that monitor the state of the transporter and the input commands of the rider. The processor uses the sensor signals to determine and transmit the appropriate command to the motor amplifiers. The information transmitted to the processors by the sensors include the spatial orientation of the transporter provided by an inertial measurement unit (IMU) 181, 182, the rider directed turn command provided by a yaw input device (YID) 132, 142, and the presence of a rider on the transporter provided by a rider detector (RD) 161, 162, 163, 164. Other inputs to the processor may include a rider operated pitch trim device (PTD) 148 for adjusting the pitch of the transporter to a more comfortable pitch and a stop button (not shown) for bringing the transporter to a stop quickly. Depending on the importance of the sensor to the operation of the transporter, the sensors may or may not be duplicated for redundancy. For example, the spatial orientation of the transporter is central to the operation of the transporter, as is described below, and therefore an A-group IMU 181 supplies transporter orientation information to the A processor 135 and a B-group INM 182 supplies transporter orientation information to the B-processor 145. On the other hand, the transporter may still be operated in a safe manner without the PTD 148 so only one such device is typically provided. Similarly, an output device such as a display 138 does not require redundancy. A non-redundant device such as a display 138 or a PTD 148 may be connected to either processor.

In the embodiment depicted in FIG. 2, display 138 is controlled by the A processor 136 and the PTD 148 is in direct signal communication with the B processor 145. The information provided by the PTD 148 is transmitted by the B processor 145 to the A processor 135 via the B channel 147.

Additionally, each processor 135, 145 communicates with one of the user interface processors (UIPs) 173, 174. Each UIP 173, 174 receives steering commands from the user through one of the yaw input devices 171,172. A A-group UIP 173 also communicates to the non-redundant UIDs such as the display 138, brake switch 175, and pitch trim control 148. Other user interface devices that are not provided redundantly in the embodiment shown in FIG. 2, such as a sound warning device, lights, and an on/off switch, may also be connected to the A-group UIP 173. The A-group UIP 173 may also pass along information provided by the user interface devices to the B-group UIP 174.

In accordance with preferred embodiments of the invention, the A-group UIP 173 compares calculations of the A-group processor with calculations of the B-group processor and queries the A-group processor 135 with a 'watchdog' calculation to verify operation of the A-group processor. Similarly, the B-group UIP 174 queries the B-group processor 145 to verify normal operation of the B-group processor.

Several components of personal transporter 10, in accordance with various embodiments of the present invention, are now described.

Battery

The transporter power required to drive the motors 110, 120 and electrical components may be supplied by any known source of electrical power known in the electrical arts. Sources of power may include, for example, both internal and external combustion engines, fuel cells, and rechargeable batteries. In preferred embodiments of the present invention, power supplies 131, 141 are rechargeable battery packs. Various battery chemistry modalities may be used, as preferred under various conditions, and may include, without limitation, lead-acid, Lithium-ion, Nickel-Cadmium (Ni—Cd), or Nickel-metal hydride (Ni—MH) chemistry. Each power supply 131, 141 is enclosed in a container that protects the battery packs and associated electronics from the environment.

Figure 3:
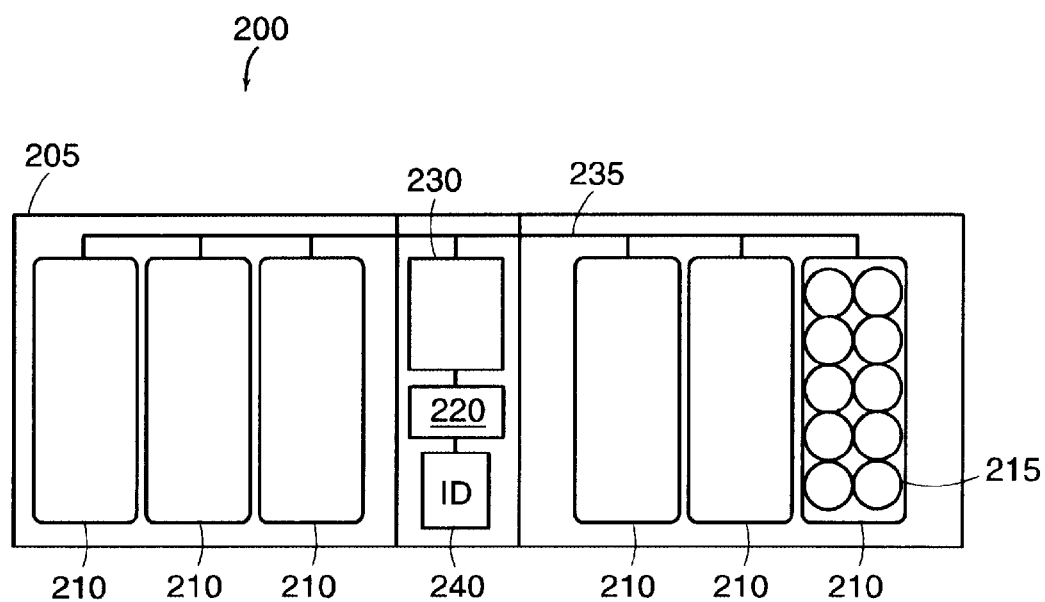
FIG. 3 shows a top view of the power source with the top cover removed.

FIG. 3 shows a top view of one embodiment of the power supply with the top cover removed. A tray 205 that is covered and sealed to protect the contents from the environment encloses the components of power supply 200. Tray 205 houses a plurality of battery blocks 210, each of which contains a plurality of battery cells 215. The number of cells 215 packaged in a block 210 and the total number of blocks in the power supply are determined by the expected power requirements of the transporter. In a preferred embodiment, cells 215 are "sub-C"-size cells and each block 210 contains ten cells 215. In another embodiments, block 210 may contains other numbers of cells 215. Cells 215 are preferably connected in series, as are blocks 210. In other embodiments blocks 210 may be connected in parallel with the cells 215 within each block connected in series, or, alternatively, blocks 210 may be connected in series with the cells 215 within each block 210 connected in parallel, each configuration providing advantages for particular applications.

Electrical current flowing into or out of power supply 200 is conducted through a connector 220 that provides the electrical interface between the power supply 200 and the transporter 10. In an embodiment shown in FIG. 3, connector 220 is located on the top cover (not shown) of power supply 200 but any positioning of connector 220 is within the scope of the present invention. In addition to conducting current into or out of power supply 200, connector 220 may also include a plurality of signal lines that establish signal communication between the power supply internals and any other transporter processor.

The temperature of each block 210 is monitored by the supply controller 230 through temperature sensors 235. In addition, supply controller 230 also monitors the voltage of each block 210. If supply controller 230 detects that the temperature of a block 210 is over a preset temperature limit, the supply controller 230 sends an over-temperature signal to the processor through connector 220. Similarly, if supply controller 230 detects that the voltage of a block 210 is below a preset voltage limit, the supply controller 230 sends an under-voltage signal to the processor through the connector 220.

Supply controller 230 preferably contains an ID chip 240 that stores information about the power supply such as battery type, the number of cells in the power supply 210, and optionally, a date code or serial number code. The ID chip 240 may be of any type of permanent or semipermanent memory devices known in the electronics art. The information contained in the ID chip 240 may be used by the processor 135, 145 to set various operating parameters of the transporter. The information may also be used by a charger (not shown) to recharge the power supply.

Power supply 200 may be connected via connector 220 to a charger that is either external to the transporter or contained within the transporter. In one embodiment of the present invention, the charger is located on the transporter and is an AC switch mode charger well known in the power art. In another embodiment, the charger is contained within battery tray 205. In another embodiment of the present invention, power supply 200 is charged by an auxiliary power unit (APU) such as the one described in copending U.S. patent application Ser. No. 09/517,808 entitled "Auxiliary Power Unit".

Motor Amplifier & Operating Modes

Figure 4:
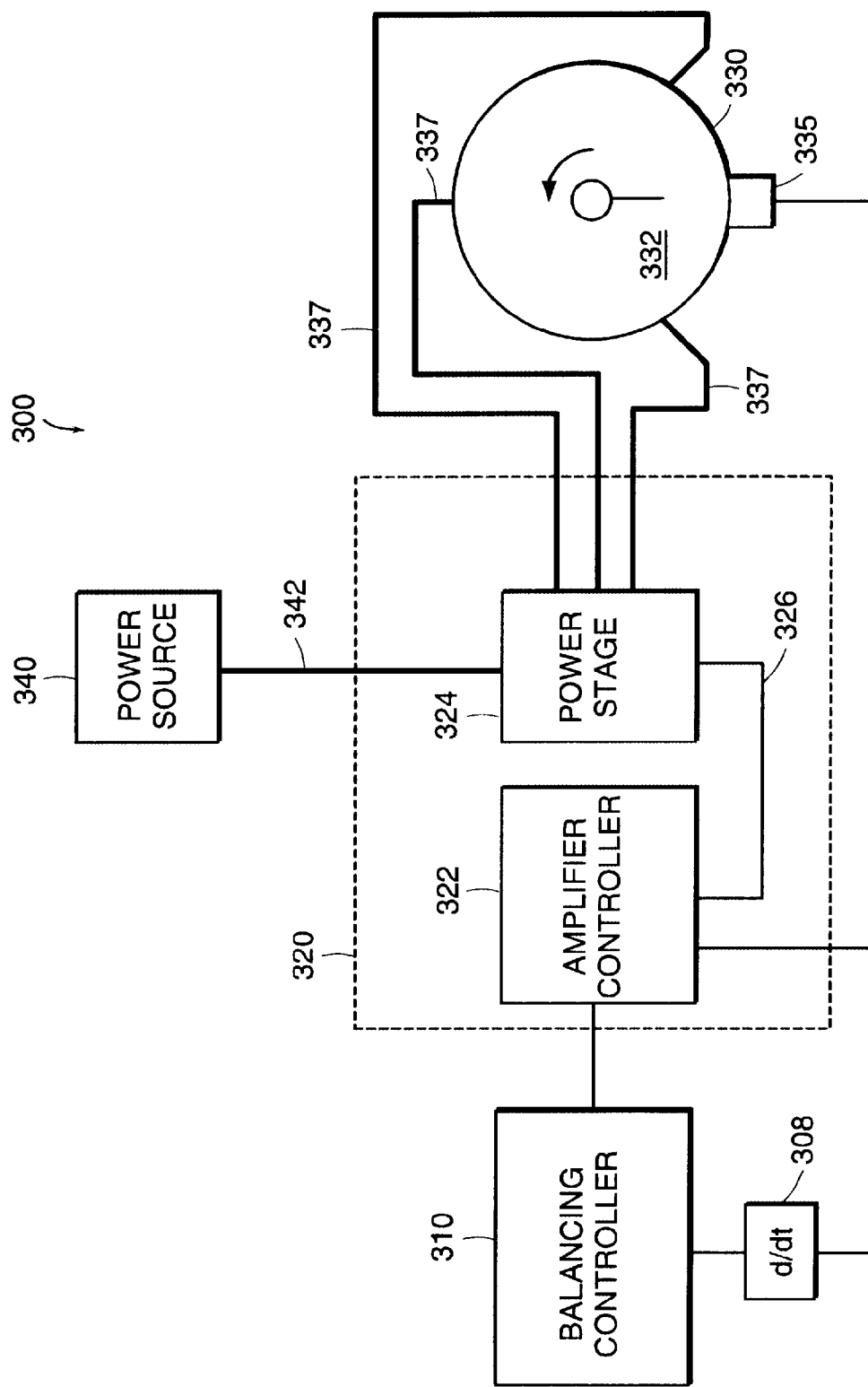
FIG. 4 is a block diagram of the power drive module of an embodiment of the present invention.

FIG. 4 shows a block schematic of a power module 300 of one embodiment of the present invention. A balancing processor 310 generates a command signal to motor amplifier 320 that, in turn, applies the appropriate power to motor 330. Balancing processor 310 receives inputs from the user and system sensors and applies a control law, as discussed in detail below, to maintain balance and to govern motion of the transporter in accordance with user commands. Motor 330, in turn, rotates a shaft 332 that supplies a torque, $\tau$, at an angular velocity, $\omega$, to a wheel 20, 21 (shown in FIG. 1) that is attached to shaft 332. In some embodiments, a transmission, not shown, may be used to scale the wheel speed in relation to the angular velocity of the shaft 332. In a preferred embodiment of the present invention, motor 330 is a three-coil brushless DC motor. In that embodiment, motor 330 has three sets of stator coils although any number of coils may be used. The stator coils are electrically connected to a power stage 324 by coil leads 337 capable of conducting large currents or high voltages. It is understood that the large currents and high voltages are relative to the currents and voltages normally used in signal processing and cover the range above 1 ampere or 12 volts, respectively.

Motor amplifier 320 itself contains both an amplifier processor 322 and a power amplification stage 324. Amplifier controller 322 may be configured to control either current or voltage applied to the motor 330. These control modes may be referred to as current control mode and voltage control mode, respectively. Power stage 324 switches the power source 340 into or out of connection with each coil, with the switching of the power stage 324 controlled by the amplifier controller 322. An inner loop 326 senses whether the output of power stage 324 is as commanded and feeds back an error signal to amplifier controller 322 at a closed loop bandwidth, preferably on the order of 500 Hz. Additionally, control by amplifier controller 322 is based, in part, on a feedback signal from shaft feedback sensor (SFS) 335.

Shaft feedback sensor 335 is also in signal communication with the processor 310 and provides information related to the shaft position or motion to the processor. The shaft feedback sensor 335 may be any sensor known in the sensor art capable of sensing the angular position or velocity of a rotating shaft and includes tachometers, encoders, and resolvers. In a preferred embodiment, a Hall sensor is used to sense the position of the rotating shaft 332. An advantage of a Hall sensor is the low cost of the sensor. In order to obtain a measure of shaft rotation velocity from a position signal provided by shaft feedback sensor 335, the position signal is differentiated by differentiator 308. The outer feedback loop 342 operates at a bandwidth characteristic of the balance control provided by balance processor 310 and may be as low as 20–30 Hz.

Figure 5:
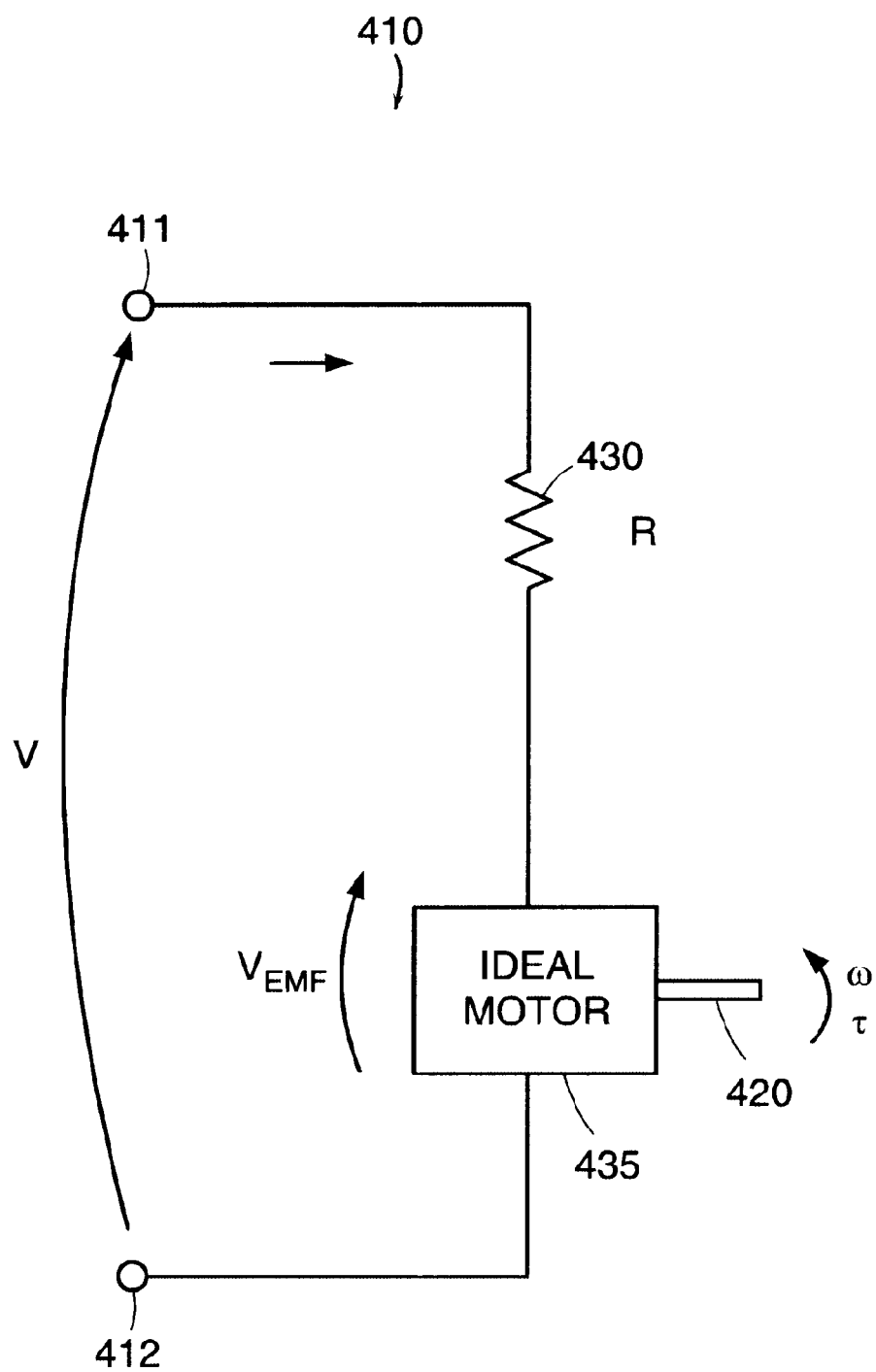
FIG. 5 is an electrical model of a motor.

While current and voltage may be equivalent in certain applications, voltage control is advantageously applied in embodiments of transporter control where the outer loop bandwidth is more than 3–4 times slower than the inner closed loop bandwidth, for the reasons now discussed with reference to FIG. 5. FIG. 5 shows an electrical model 410 of a motor. A motor has a pair of terminals 411, 412 across which a voltage V is applied. Motor 410 also has a rotating shaft 420 characterized by a shaft velocity, $\omega$, and a torque, $\tau$. Motor 410 may be modeled by resistor 430 of resistance R carrying a current i in series with an ideal motor 435 having a voltage drop $V_{emf}$. For an ideal motor, $V_{emf}=k_v \cdot \omega$ and $\tau=k_c \cdot i$ where $k_v$ and $k_c$ are motor constants. Series resistor 430 models the losses of the motor 410.

The differences in behavior of transporter 10 (shown in FIG. 1) due to voltage control or current control can be seen using the example of a transporter encountering and driving over an obstacle. When a wheel 20 of the transporter encounters an obstacle, the wheel velocity will decrease because the torque applied to the wheel is insufficient to drive the wheel over the obstacle. The drop in wheel velocity will be reflected in a decrease in the back-electromotive-force ("back-emf") voltage across the ideal motor.

Considering, first, the case of voltage control: If the amplifier is in voltage control mode, the voltage applied to terminals 411, 412 remains constant and additional current will be drawn through resistance 430 and ideal motor 435. The additional current through the motor will generate the additional torque to drive the wheel over the obstacle. As the transporter drives over the top of the obstacle, the wheel will accelerate under the additional torque that was generated to drive over the obstacle but is no longer required to drive off the obstacle. As the wheel accelerates, the back-emf across the motor will increase and the current through R will decrease in order to keep the voltage across terminals 411, 412 constant. The decrease in current reduces the applied torque generated by the ideal motor thereby reducing the acceleration of the wheel. The advantage of voltage control mode is that the ideal motor naturally draws the current required to drive over the obstacle and naturally reduces the current to drive off the obstacle without any change required in the motor command. As long as the power source can supply the required current, the motor essentially acts as its own feedback sensor and the control loop delay for the motor is essentially zero.

Under current control mode, on the other hand, the amplifier will keep the current constant through resistor 430 and ideal motor 435 until the controller sends a new current command during the next processor frame. When the wheel encounters the obstacle, $\omega$ decreases and the back-emf across the ideal motor decreases. However, since the amplifier controller is keeping the current constant, the voltage across terminals 411, 412 is allowed to drop. Since the current is held constant by the amplifier controller, the torque remains constant. However, the torque is insufficient to drive over the obstacle and the inertia of the moving transporter will cause the transporter to pitch forward. As the transporter begins to pitch forward over the obstacle, the balancing controller will detect the pitching, either through a change in the pitch error or through a change in the velocity, and command an increase in current to the amplifier controller, in accordance with the control algorithm taught in U.S. Pat. No. 5,971,091. The motor amplifier will respond to the increased current command by supplying additional current through R and the ideal motor. The increased current through the ideal motor increases the torque applied to the wheel until it is sufficient to drive the wheel over the obstacle. As the transporter moves over the obstacle, however, the increased torque will accelerate the wheels since the obstacle no longer resists the wheels. The wheel acceleration will cause the wheels to move ahead of the transporter's center of gravity (CG) and cause the transporter to pitch backward. The balancing controller will detect the pitching condition through either a change in pitch error or through a change in the transporter velocity and command a decrease in the current supplied to the ideal motor thereby reducing the torque applied to the wheel.

If the delay caused by the balancing controller is negligible and the accuracy of the velocity information fed back to the balancing controller is extremely high, the rider will not notice a difference whether voltage or current control is used. However, if the controller or shaft sensor selected for the transporter has a limited bandwidth, current control mode will not provide the prompt response that voltage control mode exhibits for small obstacles. In a preferred embodiment of the invention, a low-cost Hall effect sensor is employed to detect shaft rotation. In addition, for reasons described below, limitations on the selection of the gains used in the control law for current control mode result in a softer transporter response relative to voltage control mode.

Rider Detector

Operating modes of the transporter may include modes wherein the rider is supported by the transporter but may also include modes where the rider is not supported by the transporter. For example, it may be advantageous for the rider to be able to 'drive' the transporter while walking alongside or behind it.

Figure 6A:
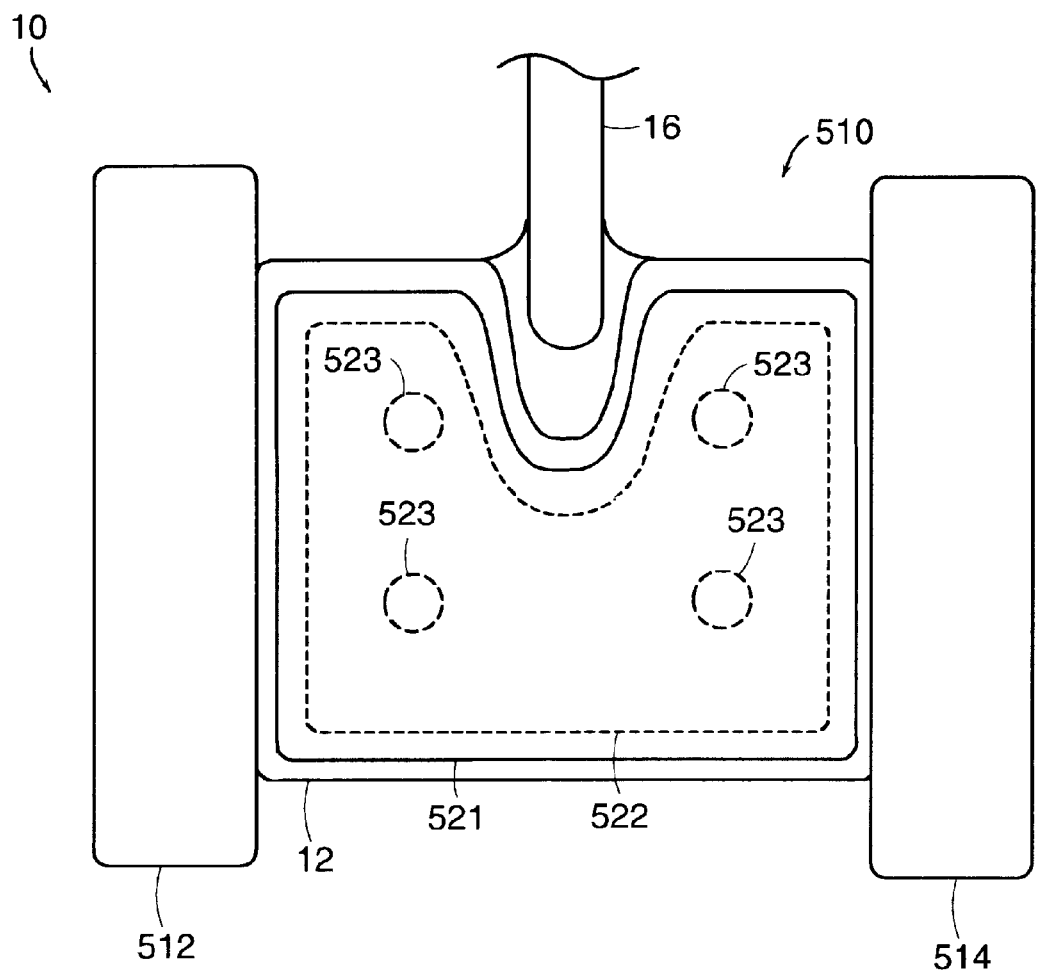
FIG. 6a shows a top view of a rider detector in accordance with an embodiment of the present invention.
Figure 6B:
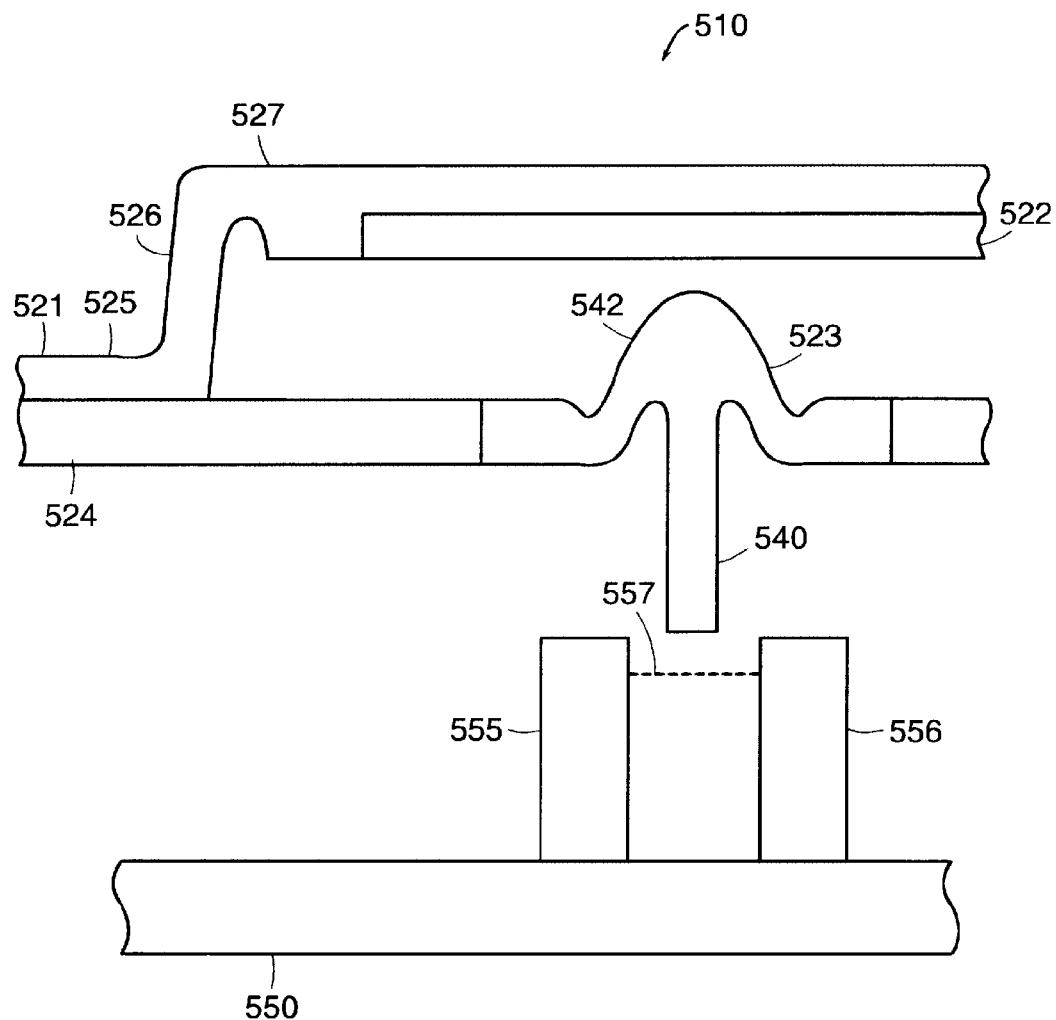

Additionally, it is advantageous for certain safety features of the transporter to be triggered if the rider leaves the transporter while the transporter is in motion. FIGS. 6a and 6b show a rider detection mechanism used in an embodiment of the present invention. FIG. 5a shows a top view of the rider detector designated generally by numeral 510. Transporter 10 incorporating the rider detector includes a base 12, left wheel fender 512, right wheel fender 514, support stem 16 for handlebar 14 (shown in FIG. 1). Wheel fenders 512 and 514 cover the corresponding wheels. Support stem 16 is attached to the base 12 and provides a sealed conduit for transmission of signals from controls 32, 34 (shown in FIG. 1) that may be located on the handlebar to the control electronics sealed in the base 12. Wheel fenders 512, 514 are rigidly attached to the sides of the base.

The top of base 12 provides a substantially flat surface and is sized to comfortably support a rider standing on the base 12. A mat 521 covers the top of the base 12 and provides additional protection to the base 12 from particles and dust from the environment. In an alternate embodiment, the mat may also cover part of the fenders 512 514 and may be used to cover a charger port (not shown) that provides for external charging of the power supply. Mat 521 may be made of an elastomeric material that provides sufficient traction such that the rider does not slip off the mat 521 under expected operating conditions. A plate 522 is position ed between base 12 and mat 521. Plate 522 is made of a rigid material and evenl distributes the force acting on the plate 522 from the rider's feet such that at least one rider detection switch 523 is activated when a rider is standing on the mat.

FIG. 6b shows a cut side view of rider detector 510. Switch 523 is made of an elastomeric material that may be fabricated as an integral part of the base cover 524. Although the fabrication cost may be greater, making the switch 523 integral with the base cover 524 eliminates a possible leak source. Switch 523 has a stem 540 extending below base cover 524 and a top 542 that extends above the base cover 524. When top 542 is depressed, switch 523 deforms such that a stem 540 is displaced downward toward an electronics board 550 that is sealed within base 520. A n optical switch is located on the electronics board 550 such that when stem 540 is displaced downward, stem 540 interrupts a light beam 557 generated by a source 555 and the light beam interruption is detected by an optical detector 556.

The mat edge 525 is preferably attached to the top of the base cover 524. Mat 521 has a raised portion 527 that is support by a wall 526 connecting the mat edge 525 to the raised portion 527. The height of the wall 526 is sized such that plate 522 does not exert a force on the switch 523 when there is no weight on the mat 521. When the rider steps on the raised portion 527, plate 522 is displaced toward electronics board 550 until stem 540 interrupts light beam 557. When the rider steps off of the transporter, mat 521 returns to the raised configuration as does switch 523 thereby re-establishing light beam contact between the source 555 and detector 556.

Steering Device

Figure 7:
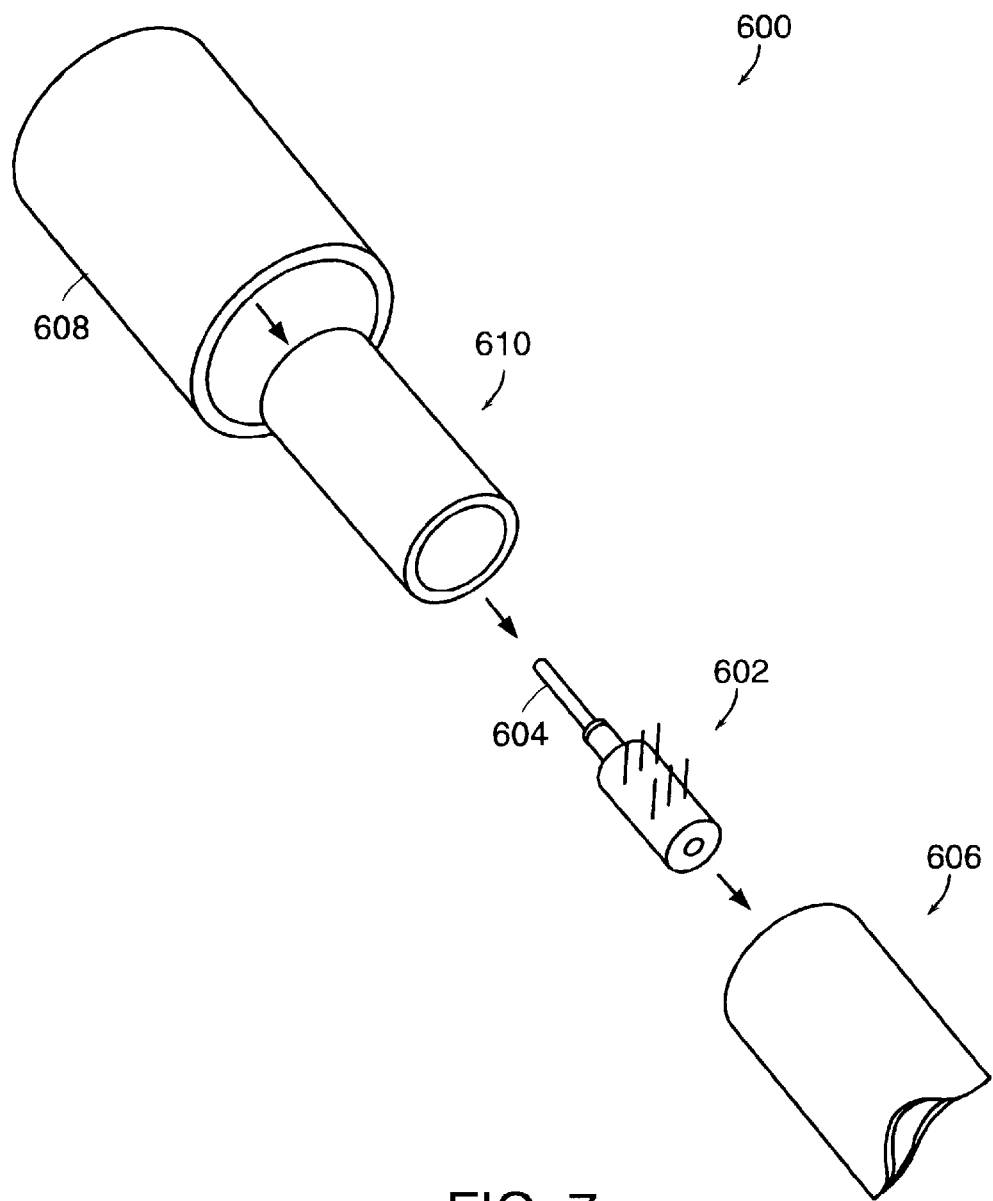
FIG. 7 shows an exploded view of a yaw input device in accordance with an embodiment of the present invention.

Referring now to FIG. 7, an exploded view is shown of an embodiment of a steering device for a scooter-like vehicle such as the balancing vehicle 10 of FIG. 1. A potentiometer 602, or other sensor of the position of a rotatable shaft 604, is attached to a housing 606. The housing may be part of handlebar 14 (shown in FIG. 1). A rotatable grip 608 is attached to potentiometer shaft 604 and provides a grip for the rider. A torsional spring 610 is connected at one end to the rotatable grip 608 and at the other end to the potentiometer 602 or to housing 606. As the rider rotates grip 608, the grip turns shaft 604. Potentiometer 602, with voltage suitably applied across it, as known in the art, generates a signal substantially proportional to the rotation of the shaft. If the rider releases the grip, torsional spring 610 rotates grip 608 and the shaft to their respective neutral or zero positions. Return of grip 608 to its neutral position allows the transporter to continue traveling in the same direction as when the grip was released. If the grip was not returned to the neutral position when released, the transporter would continue to turn in the direction of the residual rotation.

The direction of rotation may be used to encourage the rider to lean into the turn. For example, referring further to FIG. 7, if the rider's right hand holds grip 608, a twist in the direction of the rider's fingers corresponds to a right turn. The rotation of the rider's right wrist to the outside of the handlebar encourages the rider to shift weight to the right and into the turn. Shifting weight into the turn improves the transporter's lateral stability.

Referring now to FIGS. 8a–8d, a thumb-activated, elastomer-damped, steering input device is shown and designated generally by numeral 620. A rotation sensor 622, which is preferably a potentiometer but may be any rotation sensor, is coupled to a structure fixed, with respect to rotation, to the support of a personal transporter, preferably to handlebar 14 (shown in FIG. 1). A shaft 624 of the steering device 620 is bent with respect to a pivot point 626 in response to force applied to thumb button 630 by thumb 628 of the user. As shaft 624 is bent, local rotation about pivot 626 is read by rotation sensor 622, and a signal characteristic of the rotation is transmitted to the transporter controller. Shaft 624 of input device 620 is comprised of elastomeric core 632 surrounded by metal sheath 634. Elastomeric core 632 may be rubber, for example. Distal end 636 of shaft 624 is captured between limit posts 638 which extend from the handlebar and which limit displacement of shaft 624 when the user rotates the proximal end 640 of the device.

Figure 8A:
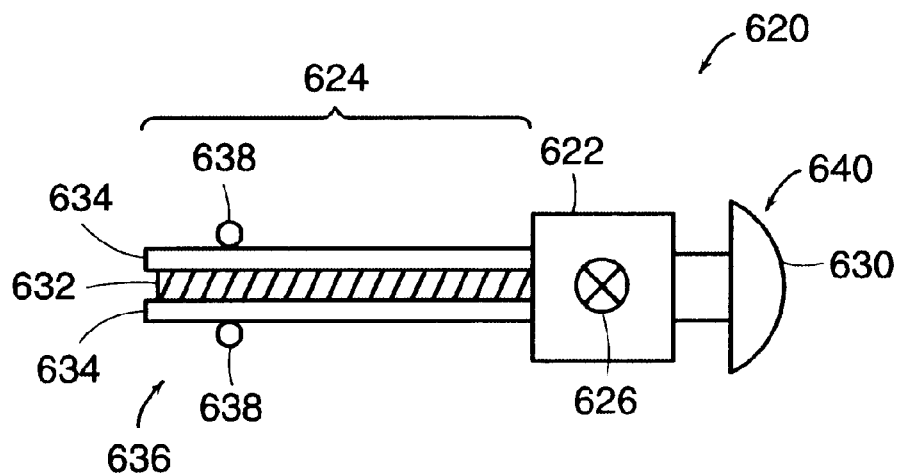
FIG. 8a is a cross-sectional top view of an elastomer-damped yaw input device, shown in its relaxed position, in accordance with an embodiment of the present invention.
Figure 8B:
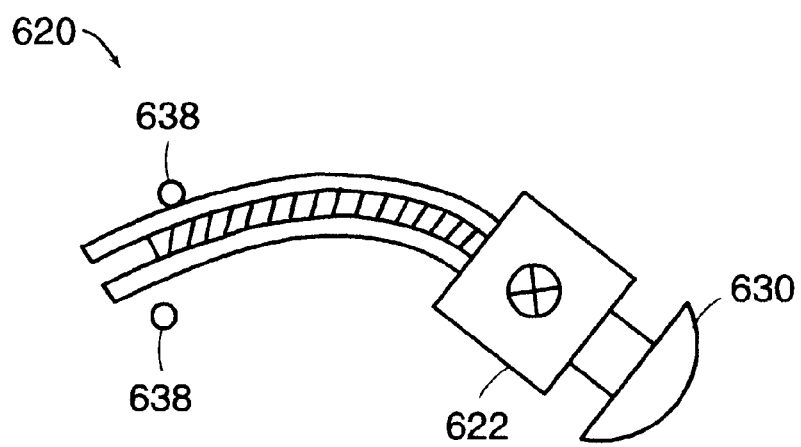
FIG. 8b is a cross-sectional top view of the yaw input device of FIG. 8a shown in a deflected position.
Figure 8C:
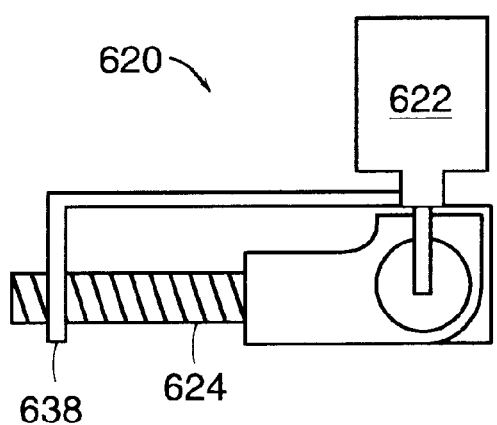
FIGS. 8c and 8d are back and top views, respectively, of the yaw input device of FIG. 8a coupled to a handlebar of a personal transporter in accordance with an embodiment of the present invention.
Figure 8D:
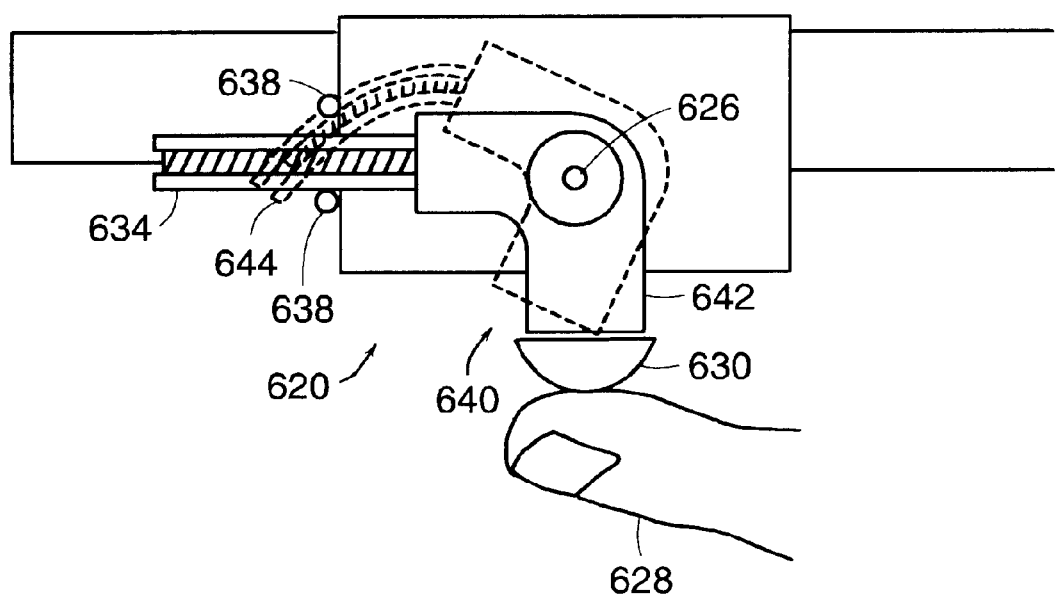

User's rotation of proximal end 640 causes shaft 624 to bend as shown in FIG. 8b. Metal sheath 634 acts as a leaf spring, providing a restoring force that counters user's rotation of the device, and brings the device back to the neutral configuration depicted in FIG. 8a. Elastomeric core 632 acts as a shear spring that opposes rotation of the device by the user and increases the opposition as the deflection increases. Increased opposition arises due to differential sliding between metal sheath 634 and elastomeric core 632 as the long (distal) end 624 is bent. The back view of steering input device 620 shown in FIG. 8c shows potentiometer 622 for generating a signal substantially proportional to rotation of shaft 624. The top view of steering input device 620 shown in FIG. 8d shows the roughly L-shaped elbow 642 of the proximal end 640 of input device 620. Dashed outline 644 depicts the steering input device in the deflected condition corresponding to FIG. 8b.

Figure 9A:
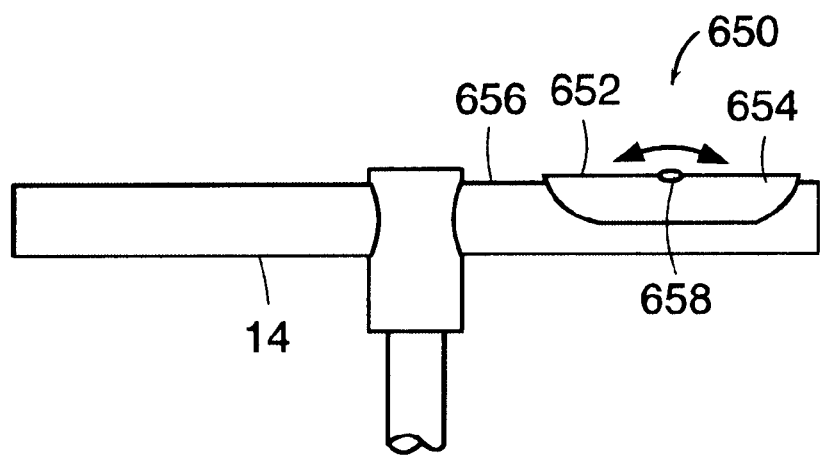
FIGS. 9a and 9b depict a palm steering device, in a rest state and activated state, respectively, as implemented in a handlebar of a personal transporter in accordance with an embodiment of the present invention.
Figure 9B:
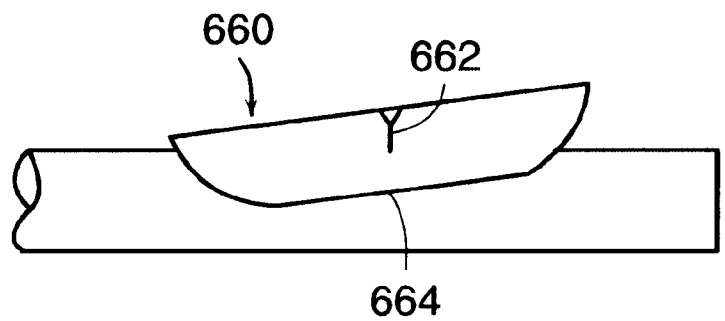

A further steering device for the personal transporter 10 of FIG. 1 is shown in FIGS. 9a and 9b, in accordance with another embodiment of the invention. Palm steering device 650 is contained on the surface of handlebar 14. In the rest state depicted in FIG. 9a, upper surface 652 of lever 652 is substantially parallel to and substantially flush with upper surface 656 of handlebar 14. Lever 652 is constrained to rotate about pivot 658 which is substantially parallel to the ground and parallel to the forward direction of motion of the transporter. The rider places a palm of a hand over lever 652 and, by pressing one side 660 or the other of lever 652 about pivot 658, causes generation of a steering signal. The steering signal is generated by a rotation sensor 662 at the pivot 658 or by pressure sensors either side of fulcrum 664.

Inertial Measurement Unit The inertial measurement unit (IMU) houses the sensors used by the processor to determine the orientation and speed of the transporter. Full redundancy may be accomplished through the use of two IMUs that are preferably physically separated from each other and powered by separate power supplies as shown in FIG. 2. Spatial constraints may require the redundant IMUs to be housed in the same package while still maintaining independent power supplies and independent signal lines to separate processors.

In an embodiment of the present invention, the A-side and B-side IMUs 181 and 182 (shown in FIG. 2) are housed in a single package. Each IMU may be equipped to measure the transporter orientation about three axes (pitch, yaw, and roll), about two axes, or about one axis (pitch). In another embodiment, each of the A-side and B-side IMUs is equipped to measure the transporter orientation about three axes. In another embodiment, a three-axis IMU may be paired with a single axis IMU.

Each IMU includes a sensor 190 (shown in FIG. 2) and the supporting electronics for the sensor. The sensor may be any device capable of generating a signal that is indicative of the orientation or the rate of change of orientation of the sensor. The generated signal is preferably nearly proportional to the orientation or rate of change of the orientation of the sensor, but other dependencies are within the scope of the present invention. For example, a sensor may be a liquid level pendulous tilt sensor, a physical gyroscope, a solid-state gyroscope, an accelerometer, or a pair of proximity s sensors arranged in a line and separated by a known distance. In various embodiments of the present invention, a solid-state gyroscope is used with a liquid level tilt sensor. The liquid level tilt sensor may be used to correct for drift in the solid-state gyroscope as described in U.S. application Ser. No. 09/458,148, herein incorporated by reference.

A single axis IMU may consist of a solid-state gyroscope and a tilt sensor with both sensors mounted to provide a signal corresponding to the pitch orientation of the transporter. The 3-axis IMU consists of at least three solid-state gyroscopes and a tilt sensor. The gyroscopes may be mounted to provide signals that correspond to a mixture of any of the rotations about three mutually orthogonal axes. Alternatively, the gyroscopes may also be mounted to avoid saturation of the gyroscope signal. The orientation of the gyroscopes will depend on the space constraints of the IMU housing, the saturation limits of the gyroscopes, and the expected performance requirements of the transporter. In one embodiment of the present invention, the 3-axis IMU consists of four solid-state gyroscopes and a tilt sensor. Use of four gyros enables the IMU to detect a failure in one of the gyros. Although the identity of the failed gyro cannot be determined, the existence of a failure is sufficient to alert the processor to take the appropriate action, as described below, while maintaining rider safety and comfort.

Processor In various embodiments of the present invention, a control program running on a processor determines the dynamic state of the transporter and calculates the appropriate command to send to the motor amplifier controllers based on the dynamic state of the transporter and on any rider commands. In a preferred embodiment, the processor also calculates the appropriate switch commands to the power stage 324 (shown in FIG. 4) thereby eliminating the need for a separate amplifier controller. The processor may be a digital signal processor (DSP) optimized for controlling motors. The term 'processor,' as used herein, also encompasses within its scope an embodiment in analog circuitry of the functions described. The circuitry and associated electronic components required to support the processor are well known in the electronic control circuit art.

Figure 10:
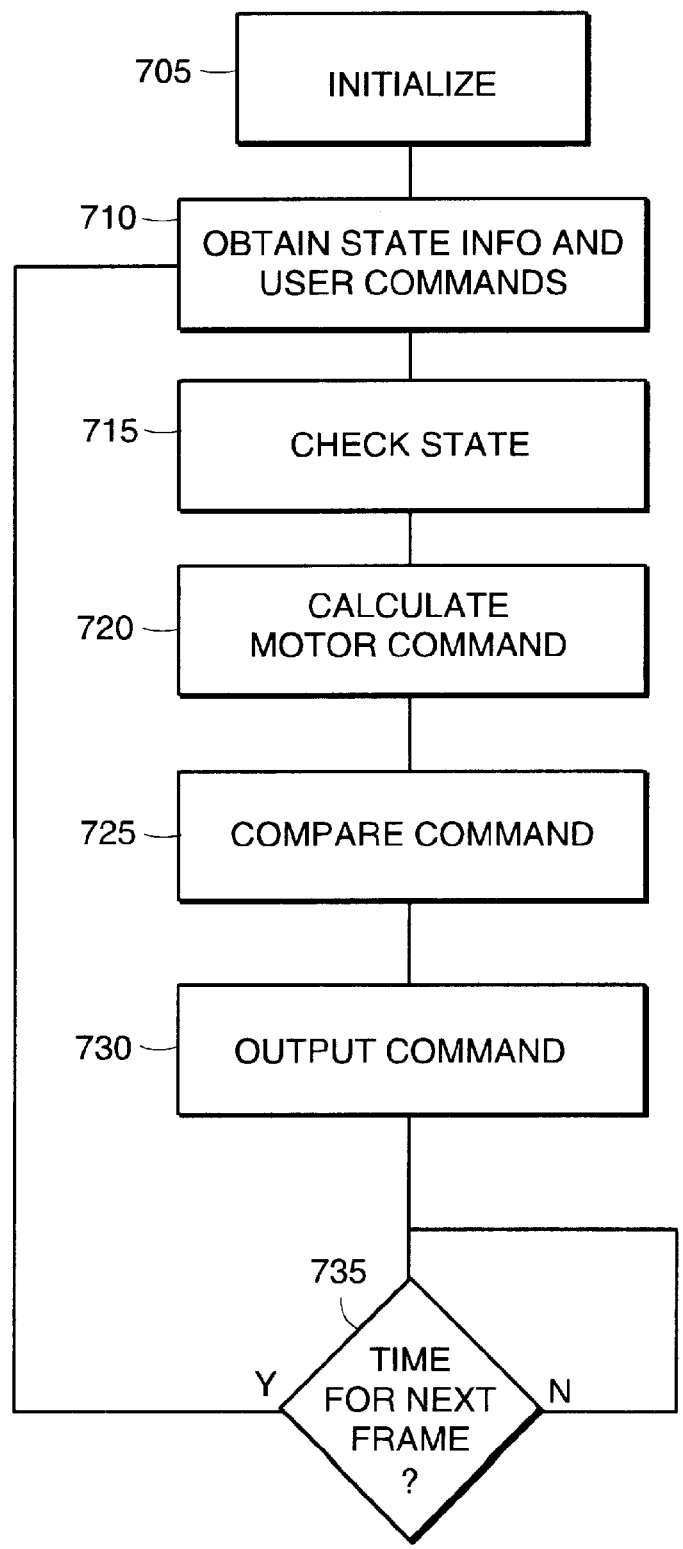
FIG. 10 is a logical flow diagram of the control program in accordance with embodiments of the present invention.

Referring now to FIG. 10, a logical flow diagram is presented of the control program executed by the processor. When the rider activates the transporter, the control program performs an initialization procedure 705. The initialization procedure performs redundancy checks between the processors, checks for any subsystem faults, and initializes the IMUs. After the subsystems and processors have passed the initialization checks and the IMUs are initialized, the initialization procedure alerts the rider that the transporter is ready for use. The alert may be an audio or visual indicator is such as a tone or a light. In a preferred embodiment, the initialization procedure gives the ready alert to the rider after the 1-axis state estimator has initialized. This allows the rider to begin using the transporter while the 3-axis state estimator is still initializing.

The program next checks for rider commands and transporter state sensor signals in 710. The rider commands may include rider detection described above, yaw commands, pitch trim commands, emergency brake commands, and mode change commands. The transporter state sensor signals may include sensors for measuring the temperature of the transporter components such as battery or motor temperature or potential sensors for measuring the voltage of the battery pack. The state sensors also include the sensors in the IMUs.

The program in 715 determines the transporter orientation based on the sensor signals from the IMUs. In a preferred embodiment, a 3-axis IMU incorporating four solid state gyros and a two-axis tilt sensor, designated as the A-side IMU, is paired with a 1-axis IMU, designated as the B-side IMU. The program first checks for a gyro failure in the A-side IMU by comparing the combined signals from two subsets of the four gyros. If the program determines that one of the four gyros has failed, the program sets an A-side IMU fault flag that will activate a procedure to bring the transporter to a safe condition as described below. The program also estimates the transporter orientation based on the signals from the B-side IMU. If the A-side IMU is not faulted, the B-side estimate is compared to the A-side estimate. If the B-side estimate differs from the A-side estimate by more than a preset amount, the program sets a B-side IMU fault flag which will also activate the safe condition procedure. If the B-side estimate agrees with the A-side estimate to within the same preset amount, the program disregards the B-side estimate and uses the A-side estimate for further processing with the knowledge that the B-side IMU is available to safely bring the transporter to a stop should the A-side IMU fail.

In another embodiment of the present invention, both the A-side and B-side IMUs are 1-axis state estimators.

The program generates the wheel motor commands in 720. This portion of the program is also referred to as the balance controller. The balance controller is described in U.S. Pat. No. 5,971,091 and U.S. application Ser. No. 09/458,148, both of which are hereby incorporated by reference.

The wheel motor commands are generated through a control law having the form $$\text{Command} = K_1\theta + K_2\theta_r + K_3x + K_4x_r$$

where $\theta$ = transporter pitch error $\theta_r$ = transporter pitch rate error x = transporter position error $x_r$ = transporter velocity error The dynamic state variables are in the form of an error term defined as the desired value minus the measured value. For example, $\theta$ is the desired transporter pitch minus the measured transporter pitch. The measured transporter pitch and pitch rate are determined from the IMU signals. The measured transporter position and transporter velocity are determined from the shaft feedback sensors. For balanced operation, the desired pitch rate is set to zero. The desired pitch may be adjusted by the rider through a pitch trim control and may also be adjusted by the control program during transporter operation.

The adjustable coefficients, $K_1$, $K_2$, $K_3$, and $K_4$, are commonly referred to as gains and together form a set of coefficients that define an operating mode. As the values of the coefficients change, the responsiveness and stability of the transporter changes. The gains are set to a value as specified by the user in selection of a mode of operation of the vehicle. For example, $K_3$ is normally set to zero to allow the transporter to travel but $K_3$ can be set to a positive value to enable the transporter to remain balanced at a stationary point.

In one embodiment, $K_1$ is set to a positive value and $K_2$, $K_3$, and $K_4$ are set to zero. In this operating mode, the transporter does not automatically balance but the rider may maintain balance and command fore/aft motion of the transporter by adjusting his/her weight in the fore/aft direction while traveling. Unlike a motorized scooter or motorcycle where the rider maintains lateral stability while commanding fore-aft motion, the transporter of the present invention operating with only a non-zero $K_1$ requires the rider to maintain balance in the fore-aft direction while simultaneously commanding fore-aft movement. The higher level of skill required to operate the transporter in such a mode may be appealing to some riders for its recreational value.

In another embodiment, $K_1$ and $K_2$ are set to positive non-zero values and $K_3$ and $K_4$ are set to zero. In this mode, the transporter is capable of maintaining balance and requires a steady-state 'error' (or 'offset') in pitch in order to maintain a steady-state speed. However, a rider could develop the skill to operate the transporter in a balanced state while avoiding instabilities through proper control of the rider's weight shifting.

In typical operation, only $K_3$ is set to zero. In this mode, the transporter maintains a small pitch 'error' while traveling at a steady speed. The responsiveness of the transporter may be modified by adjusting the values of each of the gains relative to each other. For example, if $K_1$ is increased, the rider will perceive a stiffer response in that a small lean in the forward direction will result in a large wheel command for traveling forward over bumps or accelerating rapidly in the forward direction. However, the gains cannot be adjusted in a completely independent manner and still have the transporter remain stable. The bandwidth of the sensor signals (velocity, pitch, pitch rate, etc.) as well as the bandwidth of the actuator (transmission stiffness, torque bandwidth) place an upper limit on the achievable stiffness. For another example, if the shaft feedback sensor is capable of providing a high resolution velocity signal with very small delay and the processor is capable of a high frame rate, the gains may be increased to provide a stiff transporter response while avoiding oscillatory instability. Conversely, if the shaft feedback sensor generates a noisy velocity signal or the processor frame rate is only moderate, the ability to increase the gains will be limited and the rider will experience a "mushy" or "sloppy" transporter response.

The motor commands generated by each of the A- and B-processors 135,145 (shown in FIG. 2) are compared in step 725 of FIG. 10. If the commands differ by more than a preset amount, a processor fault flag is set that will activate a safe shutdown routine for the transporter. If the motor commands are within the preset amount of each other, the commands are averaged and the averaged command is sent to the motor amplifier controllers in step 730. The program checks an internal clock in 735 and transfers execution to 710 at the appropriate time. The program loop 710 715 720 725 730 735 is referred to as a frame and is executed at least 5 times per second and preferably at least 100 times per second. Frame execution rates below 100 Hz may appear to the rider as an unsteady or unstable transporter. Higher frame rates increase the steadiness of the transporter as perceived by the rider.

Closed Loop Yaw Control With Position

Steering, or yaw control, of the transporter is accomplished by adding a turning command to the wheel amplifiers and have the following form.

LeftCmd=BalCmd+YawCmd          (1)

RightCmd=BalCmd−YawCmd         (2)

The LeftCmd and RightCmd are the command sent by the controller to the left and right motor amplifiers, respectively. The LeftCmd and RightCmd represents voltage if the amplifiers are in voltage control mode, current if the amplifiers are in current control mode, or duty cycle if the amplifiers are in duty cycle control mode. BalCmd is the command sent by the controller to each amplifier to maintain the transporter in a balanced state while moving or while at rest. The YawCmd causes the transporter to turn by reducing the command to one of the wheels while increasing the command to the other wheel. For example, a positive YawCmd increases the command to the left wheel while decreasing the command to the right wheel thereby causing the transporter to execute a right turn. The YawCmd may be generated by a yaw-input device described above with no feedback loop.

In addition to steering the transporter, the yaw controller should also be relatively insensitive to transient yaw disturbances. An example of a yaw disturbance is when one of the wheels travels over a small obstacle or bump. The wheel encountering the obstacle will slow while the other wheel continues at the original velocity thereby turning the transporter in the direction of the obstacle. A sudden, uncommanded change in the direction of travel is undesirable in any transportation device. In a preferred embodiment, a closed loop yaw controller is implemented following a control law given by:

$$\text{YawCmd} = k_p \Psi_{error} + k_d \Psi'_{error} \quad (3)$$

where $\Psi_{error}$ is given by $(\Psi_{desired} - \Psi)$, $\Psi'_{error}$ is given by $(\Psi'_{desired} - \Psi')$ is the yaw rate given by $\Psi' = c \cdot (\omega_R - \omega_L)$, $\Psi$ is the yaw given by $\Psi = \int \Psi' dt$, $k_p$, $k_d$, and c are constants and $\omega_R$ and $\omega_L$ are the right and left wheel angular velocities, respectively. The desired yaw rate, $\Psi'_{desired}$, and desired yaw, $\Psi_{desired}$, may be provided by the controller or by the rider. The transporter may be made relatively insensitive to yaw disturbances by selecting a large value for $k_d$. If $k_d$ is large, a small yaw rate error will produce a large YawCmd that will act to counter any disturbance-induced turning of the transporter. However, if $k_d$ is too large, the transporter will be susceptible to yaw instabilities that depend, in part, on the mechanical properties of the wheels and on the coupling behavior between the left and right wheel.

The gain, $k_p$, is used to correct yaw position errors. Depending on the actuator drive method (current mode, voltage mode, or duty cycle mode), $k_p$ will be more or less important in reducing the yaw error that is introduced by a disturbance force.

In one embodiment, the yaw control law for the left and right wheels is modified to replace the yaw rate dynamic variable $\Psi' = c \cdot (\omega_R - \omega_L)$ with the left and right wheel angular velocities, $\omega_R$ or $\omega_L$, respectively. Using the wheel velocities instead of the yaw rate in the yaw control law removes the coupling between the left and right wheel thereby allowing the damping gain, $k_d$, to be set to a higher value for a stiffer yaw control. However, the mechanical properties of the wheels place an upper limit on $k_d$ and therefore limit the yaw stiffness of the transporter.

As discussed above, motor amplifiers 132, 133, 142, 143 are preferably operated in voltage control mode. As discussed, voltage control allows the motor to provide an almost instantaneous feedback loop to maintain the wheel velocity during transient events due to the back-emf of the motor. The effect of controlling voltage is that a term proportional to $k^2 \omega / R$ is added to the yaw control law where k and R are characteristic of the motor, as described with reference to FIG. 5, and $\omega$ is the right or left wheel velocity for the right or left yaw control law, respectively.

Traction Control

As discussed above, the controller maintains the transporter in a dynamically balanced condition by commanding either the wheel torque or wheel speed, hereinafter referred to inclusively as wheel torque, through the power amplifiers and wheel motors. The controller monitors the orientation of the transporter through the inertial reference device and adjusts the wheel torque to maintain balance. The coupling between the wheel command and transporter orientation will depend on, inter alia, the traction between the wheel and the underlying surface hereafter referred to as the ground. If the commanded torque to the wheel exceeds the frictional breakaway force between the wheel and the ground, the wheel will slip and adversely affect the controller's ability to maintain the transporter in a balanced state. A first type of loss of traction, referred to herein as a "Type I" loss of traction, may occur if the rider tries to accelerate (or decelerate) faster than the local condition of the wheel and the ground allow. A second type of loss of traction, herein "Type II", may occur when the transporter encounters a slick spot, such as black ice, on the ground or when the transporter loses contact with the ground such as when driving the transporter off of a ramp. In both types of loss of traction, the wheel will accelerate as the wheel slips.

Figure 11:
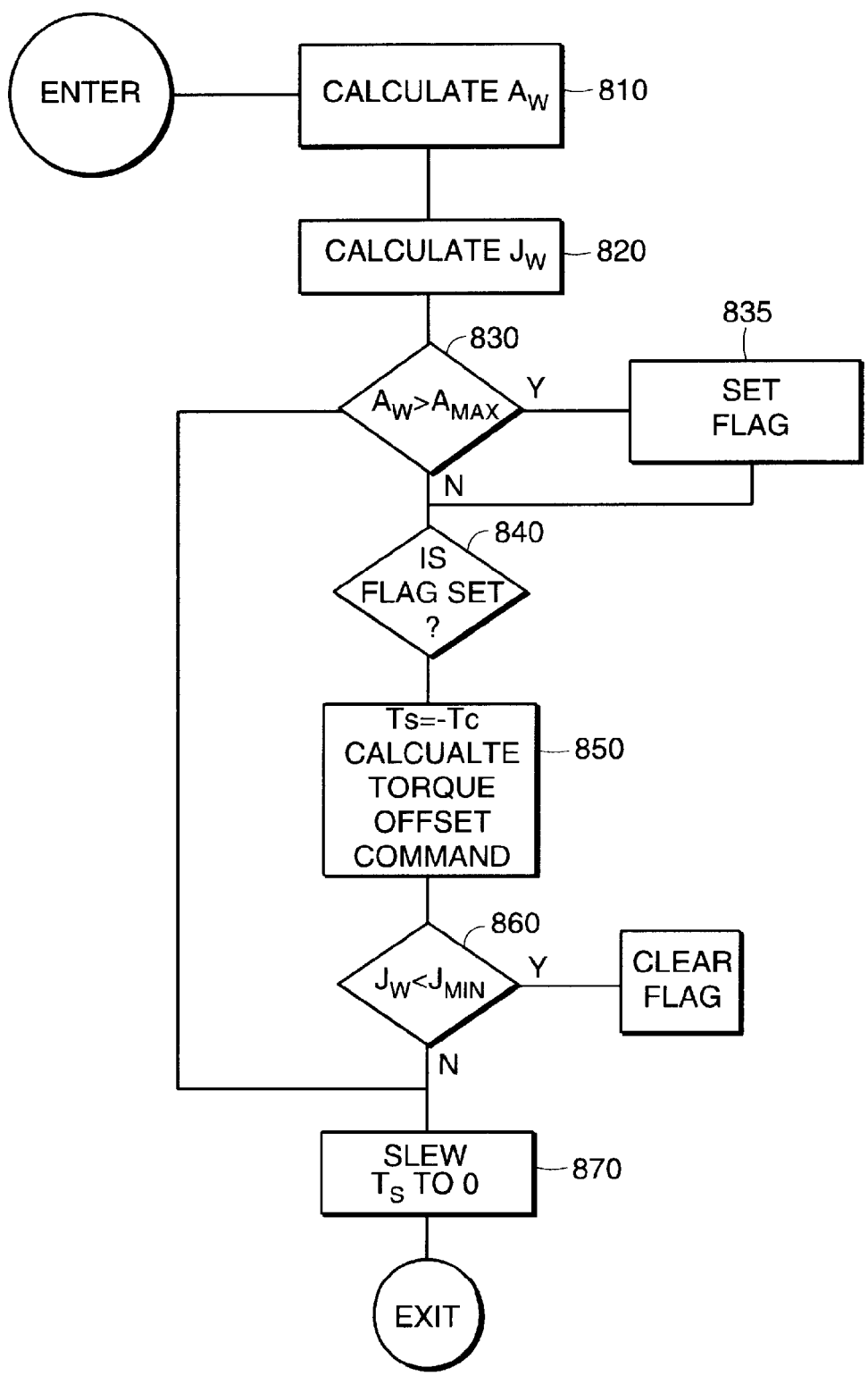
FIG. 11 is a flow diagram for traction control in accordance with an embodiment of the present invention.

Referring now to FIG. 11, a flow diagram is shown of a method of traction control in accordance with embodiments of the present invention. The controller continuously monitors the wheel speed and calculates a wheel acceleration, $A_W$, in 810. The controller also estimates the inverse wheel inertia, $J_W$, in 820 by dividing the wheel acceleration from the previous step 810 by the commanded torque provided from the balancing routine described above. The inventors have discovered that the inverse wheel inertia is a wheel characteristic capable of distinguishing between a Type I loss of traction and a Type II loss of traction. The calculated wheel acceleration is compared to a pre-set value, $A_{MAX}$, in 830. The pre-set value corresponds to an acceleration characteristic of a loss of traction and depends on the transporter characteristics in a manner readily determinable. If $A_W$ is greater than $A_{MAX}$, the controller sets a flag indicating a slip condition in 835. The controller checks the flag in 840 and if the flag is not set, the controller executes a torque slewing routine 870 described below. If the flag is set, indicating a slip condition, the controller allows the slipping wheel to free wheel. This may be accomplished by disabling the motor amplifiers commanding the slipping wheel. In a preferred embodiment of the present invention, the controller sets a torque offset to the negative of the torque command in 850 such that the sum of the torque offset and torque command that is sent to the motor amplifiers is zero, thereby allowing the wheel to s rotate freely and reduce the acceleration of the wheel. In another embodiment of the present invention, the torque offset is set to a value such that the sum of the torque offset and torque command is less than the torque command.

The controller compares inverse wheel inertia $J_W$ to a pre-set value, $J_{min}$ in 860. If $J_W$ is less than $J_{min}$, the controller clears the slip flag in 865. The inverse wheel inertia term is used to clear the slip condition because it can distinguish between a Type I and Type II loss of traction. For example, if the wheel loses contact with the surface, $J_W$ will be very large because the moment of inertia will only include the wheel and will be small. Conversely, $J_W$ will be small when the wheel remains in contact with the ground because the moment of inertia will include the whole transporter and will be large.

The torque offset is decremented or slewed to zero in 870. This allows for a smoother transition for the rider after the transporter recovers from the slip condition.

Deceleration to Zero

As discussed previously, the rider may control the fore/aft movement of the transporter by leaning. However, situations may arise where the transporter must be brought safely to a stop before the rider can react to the situation. For example, if a component used by the balancing controller fails, the controller may not be able to maintain the moving transporter in a dynamically balanced condition. If a component failure is detected, a deceleration-to-zero routine is executed by the controller to automatically bring the transporter to a stop, thereby allowing the rider to dismount from the transporter before the controller loses the capability to maintain dynamic balancing.

Figure 12:
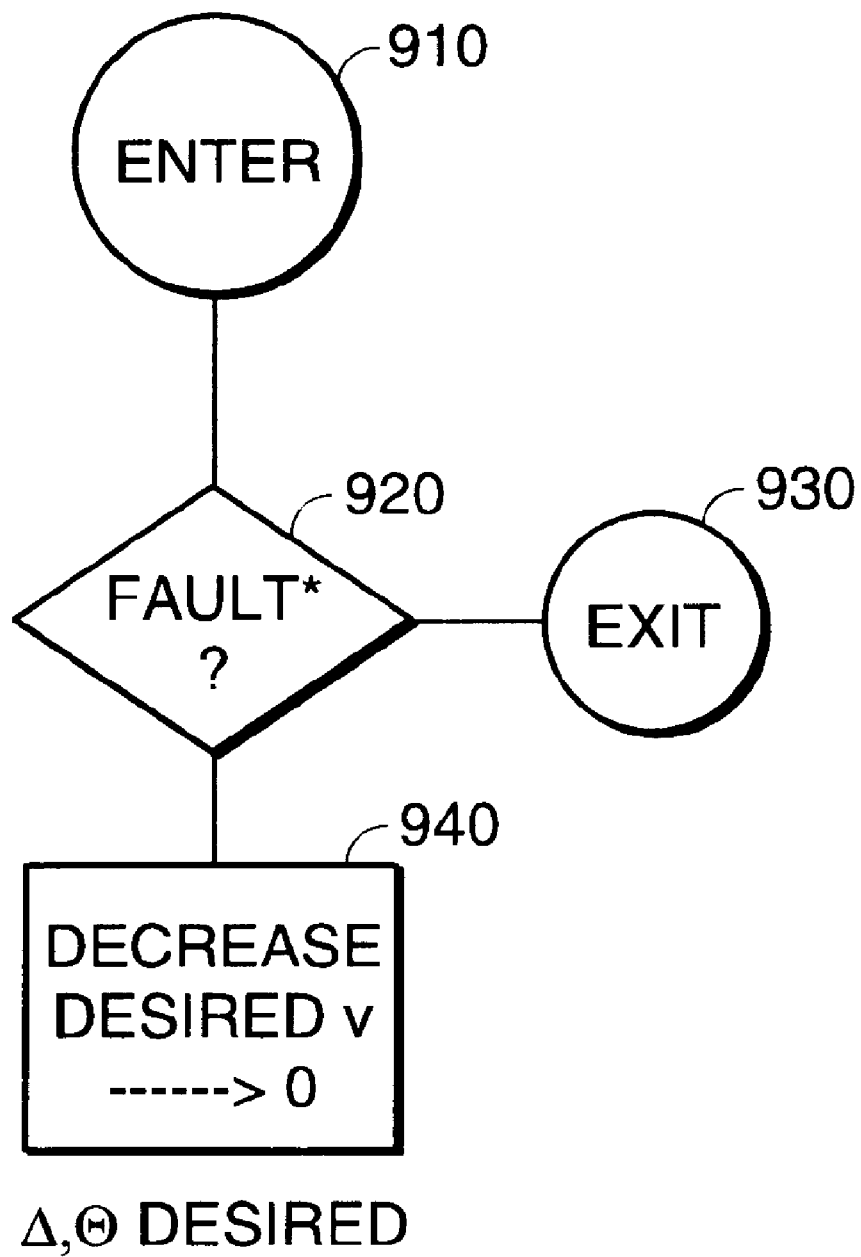
FIG. 12 is a flow diagram for deceleration-to-zero in accordance for an embodiment of the present invention.

In FIG. 12, a flow diagram is shown for the deceleration-to-zero routine. The routine is entered in 910 every controller frame. If a critical fault is not detected in 920, the routine is exited in 930. A critical fault may be any one of a variety of conditions that could affect the balancing controller. For example, a battery open condition, CPU/RAM failure, motor winding open condition, motor winding short condition, or tilt sensor failure indicate that redundancy has been lost for that component and the controller should bring the transporter to rest. Other faults, such as battery over-temperature or motor over-temperature may indicate an imminent failure of the component and may also be used to initiate the routine to decelerate the transporter to rest.

The transporter has a function which limits the speed of travel and is described in U.S. Pat. No. 5,791,425, which is herein incorporated by reference. If a critical fault is detected in 930, the controller brings the transporter to a stop by slewing the speed limit at the time the fault is detected to zero in 940. It should be understood by one of ordinary skill in the art that slewing is the process of incrementally changing a variable from an original value to a final value over several controller frames. Since each controller frame corresponds to a time interval, the number of frames over which the slewing process is completed corresponds to the time it takes to bring the transporter to a stop. The stopping time will depend on several transporter dependent factors and on rider comfort. For example, if the transporter is brought to a sudden stop, the rider may feel discomfort at the sudden and unexpected stop. Conversely, if the stopping time is very long, the probability that the backup component may fail increases. In another example, the stopping time may be based on the properties of the specific sensors used in the transporter. In one embodiment of the invention, a tilt sensor is used to correct the drift of a gyroscope. If the tilt sensor fails, the information provided by the gyroscope may remain adequate for the balancing controller until the gyroscope drift creates an error that adversely affects the controller's ability to maintain the dynamically balanced condition of the transporter. If the gyroscope has a low drift rate, the information will remain adequate for a longer period and a relatively larger stopping time may be used. Conversely, if the gyroscope has a high drift rate, a smaller stopping time will be required. In an embodiment of the present invention, the stopping time is between 1 and 10 seconds, preferably between 2 and 4 seconds.

Depending on the particular fault condition, the deceleration-to-zero routine may also adjust the commands to the remaining, non-faulted components to compensate for the failed component. For example, if a motor winding fails, the motor will continue to operate but at only half the power. A sudden reduction in one of the motors would cause the transporter to suddenly turn. To prevent such a sudden turn, the command to the operating winding of the motor is doubled to compensate for the failed winding. However, doubling the command to the remaining motor winding may exceed the operating limits on the motor amplifier causing the amplifier to fail. The expected period that the motor amplifier can function over its operating limits may determine the stopping time.

The transporter does not require a brake, in the sense of having a device for applying an external opposite torque to the wheel, because the controller and motor amplifier controls the position of the wheel directly. As mentioned previously, the fore-aft motion of the transporter is controlled by the leaning of the rider so if the rider wishes to stop, the rider merely leans in the direction opposite to the direction of the moving transporter. Although the rider's actions are the natural motions that a walking person would make, riders accustomed to operating powered vehicles may expect to use a brake to slow the transporter and in an unexpected situation may instinctively reach for a brake instead of merely leaning backward.

In one embodiment of the present invention, a brake control is incorporated into the handlebar controls. The brake control may be a simple two-state device such as an on-off switch or the switch may be a proportional device generating a signal proportion to the rider input. Activation of the brake switch causes the controller to execute the deceleration-to-zero routine described above with the following modification. The "fault condition" in 920 is the activation of the brake switch. Since the fault in this case is not a component used by the balancing controller, the stopping time (number of processor frames for the slewing process) may be lengthened to a more comfortable rate for the rider. In one embodiment, the stopping time is between 5 and 10 seconds.

If the brake control is a proportional device such as a pressure sensor, the rate of deceleration may be controlled by the rider through the application of pressure on the brake control. If the rider applies a high pressure, the rate of deceleration is increased by decreasing the number of slewing frames. Conversely, if the applied pressure is low, the deceleration rate is lowered by increasing the number of slewing frames.

What is claimed is:

1. A steering device for a motorized vehicle having a handlebar, the steering device comprising:
    (a) a rotation sensor coupled to the handlebar for generating a steering command upon rotation of the sensor about a single axis;
    (b) a rotatable grip for imparting rotary motion to the rotation sensor; and
    (c) a torsional spring for restoring the rotatable grip to a neutral position upon release of the grip.

2. The steering device of claim 1, wherein the rotation sensor is a potentiometer.

* * * * *

UNITED STATES PATENT AND TRADEMARK OFFICE
CERTIFICATE OF CORRECTION

PATENT NO. : 6,581,714 B1
DATED : June 24, 2003
INVENTOR(S) : Dean L. Kamen et al.

It is certified that error appears in the above-identified patent and that said Letters Patent is hereby corrected as shown below:

Column 18,
Lines 44 and 48, replace "rotation sensor" with -- steering control --.
Line 45, replace "sensor" with -- steering control --.
Lines 51-52, replace "rotation sensor is" with -- steering control includes --.

Signed and Sealed this

Seventh Day of October, 2003

JAMES E. ROGAN
*Director of the United States Patent and Trademark Office*